US 12,447,804 B2

(12) United States Patent
Lund

(10) Patent No.: US 12,447,804 B2
(45) Date of Patent: Oct. 21, 2025

(54) SIDE IMPACT RESTRAINT PROTECTION SYSTEM FOR A VEHICLE

(71) Applicants:Ningbo Geely Automobile Research & Development Co., Ltd., Ningbo (CN); Zhejiang Geely Holding Group Co., Ltd., Zhejiang (CN)

(72) Inventor: Kjell-Åke Lund, Mölnlycke (SE)

(73) Assignees: Ningbo Geely Automobile Research & Dev. Co., Ltd., Ningbo (CN); Zhejiang Geely Holding Group Co., Ltd., Zhejiang (CN)

(*) Notice: Subject to any disclaimer, the term of this patent is extended or adjusted under 35 U.S.C. 154(b) by 258 days.

(21) Appl. No.: 18/201,111

(22) Filed: May 23, 2023

(65) Prior Publication Data

US 2023/0294491 A1    Sep. 21, 2023

Related U.S. Application Data

(63) Continuation of application No. PCT/CN2021/137151, filed on Dec. 10, 2021.

(30) Foreign Application Priority Data

Dec. 14, 2020  (EP) .................................. 20213774

(51) Int. Cl.
    *B60J 5/04*    (2006.01)
    *B62D 25/04*    (2006.01)

(52) U.S. Cl.
    CPC ........... *B60J 5/0459* (2013.01); *B60J 5/0425* (2013.01); *B60J 5/044* (2013.01); *B60J 5/0447* (2013.01);

(Continued)

(58) Field of Classification Search
    CPC ........ B60J 5/0459; B60J 5/0425; B60J 5/044; B60J 5/0447; B60J 5/0479; B60J 5/0437;

(Continued)

(56) References Cited

U.S. PATENT DOCUMENTS

| 3,868,141 A | * | 2/1975 | Johnson ................. B60J 5/0437 |
| | | | 49/502 |
| 3,887,227 A | | 6/1975 | Deckert |
| 5,221,121 A | | 6/1993 | Zichner |
| 5,431,476 A | | 7/1995 | Torigaki |
| 5,895,088 A | * | 4/1999 | Knott ....................... B60J 5/044 |
| | | | 296/202 |

(Continued)

FOREIGN PATENT DOCUMENTS

| CN | 101269672 A | 9/2008 |
| CN | 111361642 A | 7/2020 |

(Continued)

OTHER PUBLICATIONS

International Search Report from corresponding International Application No. PCT/CN2021/137151, mailed on Mar. 1, 2022, 2 pages.

*Primary Examiner* — Amy R Weisberg
*Assistant Examiner* — Denise Lynne Esquivel
(74) *Attorney, Agent, or Firm* — Tucker Ellis LLP

(57) ABSTRACT

A side impact restraint protection system for a vehicle includes first and second side safety structures and first and second structural elements of a vehicle body structure. The first and second side safety structures are respectively connected to a first side door and a second side door. The first and second side doors are arranged to cover a common single door opening of the vehicle body structure. The first structural element is in a position in front of the door opening and the second structural element is in a position behind the door opening in a longitudinal direction. In the closed door position, the first and second side safety structures are releasably connected to each other via a connecting device, and the first and second side safety structures are respectively connected to the first and second structural (Continued)

elements via a first connection member and a second connection member.

20 Claims, 14 Drawing Sheets

(52) U.S. Cl.
CPC ............ *B60J 5/0479* (2013.01); *B62D 25/04* (2013.01); *B60J 2005/0475* (2013.01)

(58) Field of Classification Search
CPC ...... B60J 5/0456; B60J 5/0458; B60J 5/0445; B60J 2005/0475; B62D 25/04; B60R 2021/0006; B60R 21/0136
USPC .......................................... 296/187.12, 146.6
See application file for complete search history.

(56) References Cited

U.S. PATENT DOCUMENTS

| | | | | |
|---|---|---|---|---|
| 6,220,652 | B1* | 4/2001 | Browne | ............... B60J 5/044 49/502 |
| 6,332,641 | B1 | 12/2001 | Okana | |
| 2007/0102964 | A1* | 5/2007 | Yoshimoto | ............ B62D 25/04 296/187.12 |

FOREIGN PATENT DOCUMENTS

| | | |
|---|---|---|
| DE | 19828444 A1 | 12/1999 |
| DE | 102014201527 A1 | 7/2015 |
| EP | 2818347 A1 | 12/2014 |
| IN | 210116367 U | 2/2020 |
| WO | 2020108859 A1 | 6/2020 |
| WO | 2020109493 A1 | 6/2020 |

* cited by examiner

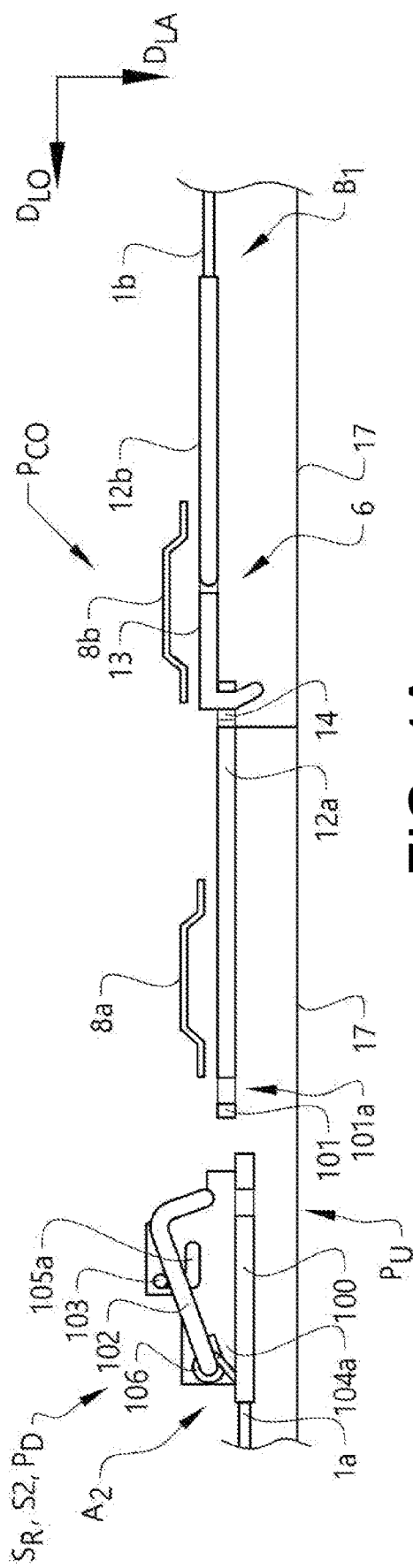
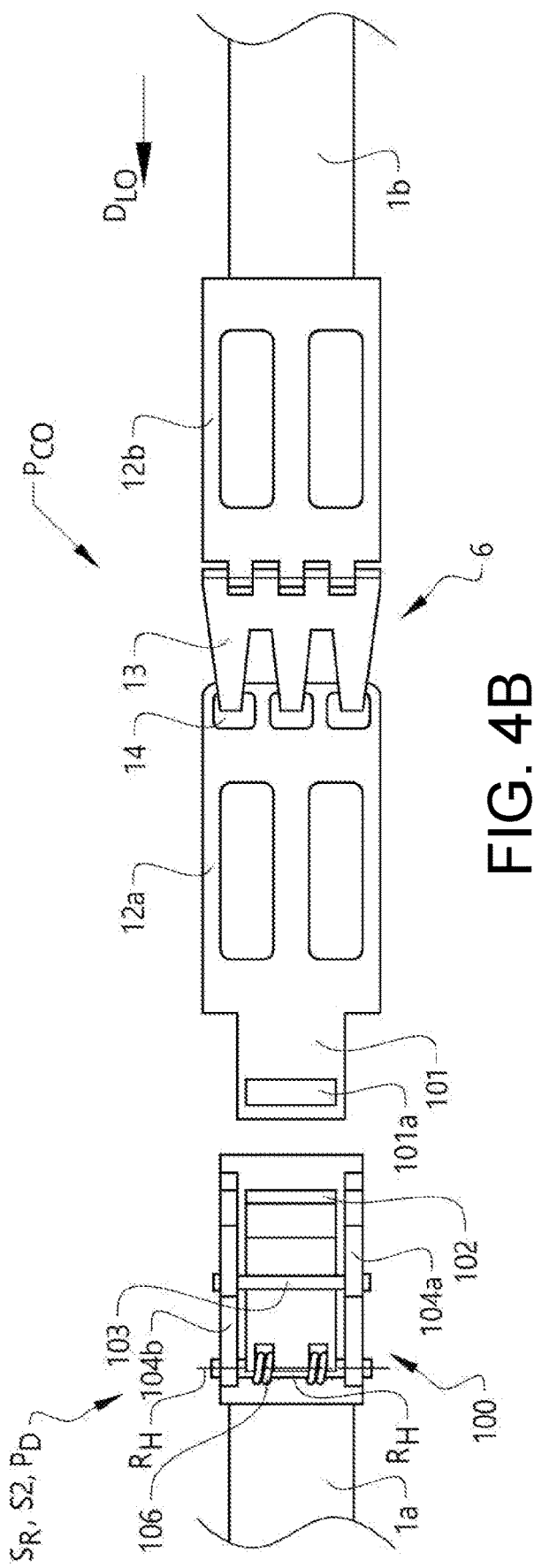
FIG. 4A
FIG. 4B

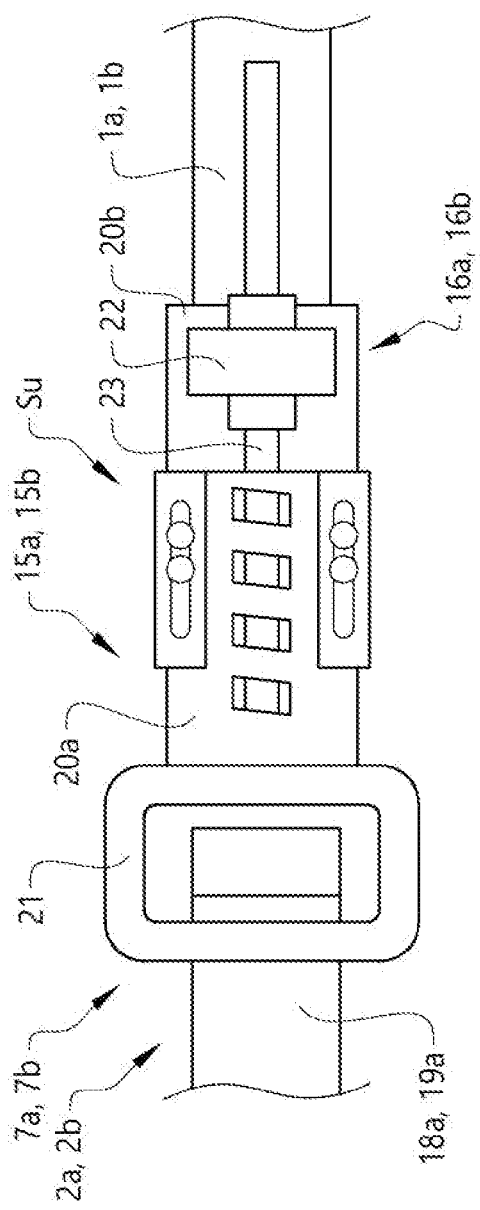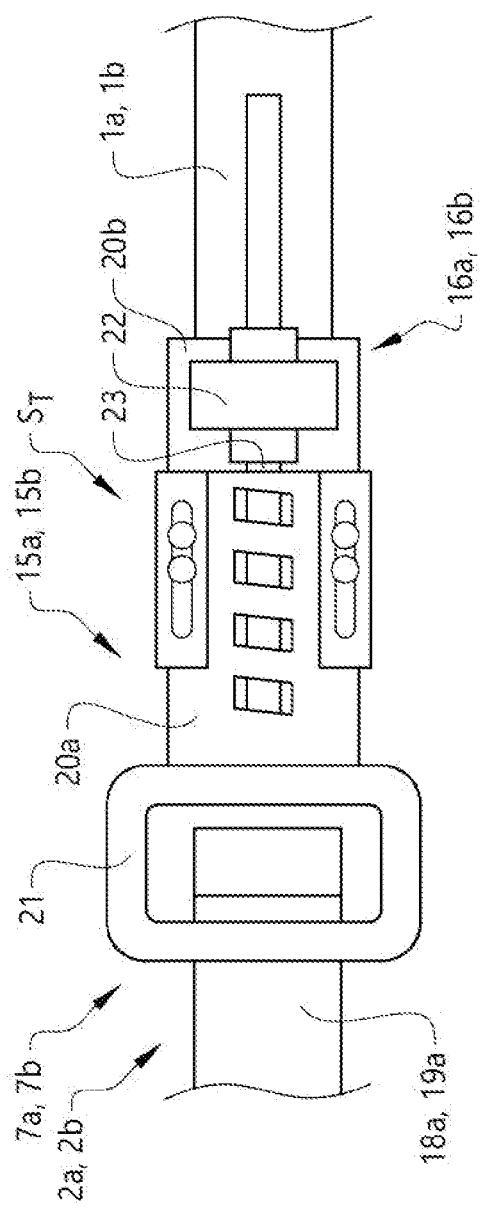

SIDE IMPACT RESTRAINT PROTECTION SYSTEM FOR A VEHICLE

RELATED APPLICATION DATA

This application is a continuation of International Patent Application No. PCT/CN2021/137151, filed Dec. 10, 2021, which claims the benefit of European Patent Application No. 20213774.1, filed Dec. 14, 2020, the disclosures of which are incorporated herein by reference in their entireties.

TECHNICAL FIELD

The present disclosure relates to a side impact restraint protection system for a vehicle. The side impact restraint protection system comprises a first side safety structure, a second side safety structure, a first structural element of a vehicle body structure of the vehicle, and a second structural element of the vehicle body structure. The first side safety structure is arranged in connection to a first side door of the vehicle and the second side safety structure is arranged in connection to a second side door of the vehicle.

BACKGROUND

Side impact systems are commonly used in vehicle constructions. Often door beam constructions arranged in the side doors of the vehicle are used to protect the occupants of the vehicle in a side impact event. The door beams are sometimes configured to cooperate with the A-pillar, B-pillar, and the C-pillar of the vehicle to capture impact energy efficiently. Door beams are due to strength requirements heavy in construction and commonly made of steel. Despite heavy and rigid door constructions, the side doors are not contributing to the strength and stiffness of the vehicle body structure as such, because there is a play with seal members arranged between the doors and the vehicle body structure. The doors are thus adding weight to the vehicle construction without strengthening the vehicle body structure, which is unfavourable from a crash safety and fuel or energy consumption perspective. Further, many of today's side impact systems will not meet future legal requirements of crash strength, and therefore stronger and heavier door beam constructions are needed, as well as stiffer, stronger and heavier car body constructions. The trend with vehicle body constructions without B-pillars is creating further needs for even stronger and heavier vehicle door constructions.

There is thus a need for an improved side impact protection system, which will meet future strength and safety requirements, where the system is lightweight in construction and suitable for different vehicle constructions, as vehicle constructions without B-pillars, where the system further is enabling and simplifying opening of the side doors after a side impact event.

SUMMARY

An object of the present disclosure is to provide a side impact restraint protection system where the previously mentioned problems are avoided.

The disclosure concerns a side impact restraint protection system for a vehicle, comprising a first side safety structure, a second side safety structure, a first structural element of a vehicle body structure of the vehicle, and a second structural element of the vehicle body structure. The first side safety structure is arranged in connection to a first side door of the vehicle and the second side safety structure is arranged in connection to a second side door of the vehicle. The first side door and the second side door are arranged to cover a common single door opening of the vehicle body structure in a closed door position. The first structural element is arranged in a position in front of the door opening in a longitudinal direction of the vehicle, and the second structural element is arranged in a position behind the door opening in the longitudinal direction. In the closed door position the first side safety structure and the second side safety structure are configured to be releasably connected to each other via a connecting device, the first side safety structure is configured to be connected to the first structural element via a first connection member, and the second side safety structure is configured to be connected to the second structural element via a second connection member.

Advantages with these features are that the construction is providing a strong and safe design of the side impact restraint protection system suitable for meeting future legal requirements for crash strength, where the system is capturing impact energy efficiently. The side impact restraint protection system with this design can be made lightweight in construction and suitable for different vehicle constructions, as vehicle constructions without B-pillars. With the system, the door can be made more lightweight in construction without traditional heavy door beams. The system is with the releasable connection via the connecting device further enabling and simplifying opening of the side doors after a side impact event.

According to an aspect of the disclosure, the system comprises a first door beam arranged in the first side door, and/or a second door beam arranged in the second side door. The first door beam is extending between a roof beam structure and a sill structure of the vehicle body structure when the first side door is arranged in the closed door position. The second door beam is extending between the roof beam structure and the sill structure of the vehicle body structure when the second side door is arranged in the closed door position. The respective side doors are suitably connected to the roof beam structure and/or the sill structure with connection or locking devices for efficiently holding the door in the closed door position.

According to another aspect of the disclosure, the first door beam is configured for replacing a B-pillar of the vehicle body structure, and/or the second door beam is configured for replacing a B-pillar of the vehicle body structure. The door beams are designed to absorb impact load and for cooperating with the side safety structures and the car body structure for efficiently protecting occupants of the vehicle.

According to an aspect of the disclosure, the first side door is a front vehicle side door and the first door beam is arranged in connection to a rear edge of the first side door, and/or the second side door is a rear vehicle side door and the second door beam is arranged in connection to a front edge of the second side door. With this arrangement of the door beams, a strong and robust system configuration is achieved for preventing major deformations of the side doors in a vehicle impact event.

According to another aspect of the disclosure, the first side safety structure is in a lateral direction of the vehicle arranged outside of the first door beam, and/or the second side safety structure is in a lateral direction of the vehicle arranged outside of the second door beam. In this way, the door beams can absorb energy in a vehicle impact event and the impact forces can be efficiently distributed via the side safety structures to the vehicle body structure.

According to a further aspect of the disclosure, the connecting device comprises a first connector part connected to the first side safety structure and a second connector part connected to the second side safety structure. The first connector part and the second connector part are configured for releasably connecting the first side safety structure and the second side safety structure to each other. The connecting device is configured for being arranged in a connected state where the first connector part and the second connector part are connected to each other and a disconnected state where the first connector part and the second connector part are disconnected from each other. The connected state is used when the side doors are arranged in the closed door position for a secure connection between the first side safety structure and the second side safety structure. The disconnected state is allowing opening of the first side door and/or the second side door.

According to an aspect of the disclosure, the first connector part or the second connector part comprises a hook and the other of the first connector part or the second connector part comprises one or more hook openings. The hook is configured for being engaged with the one or more hook openings in the connected state and configured for being disengaged from the one or more hook openings in the disconnected state. The cooperating hook and hook openings are providing a simple and secure connection between the connector parts.

According to another aspect of the disclosure, the hook is configured for pivoting between a connected position in the connected state and a disconnected position in the disconnected state. The pivoting arrangement of the hook is efficiently displacing the system between the connected and disconnected states.

According to a further aspect of the disclosure, the system comprises a first tensioning unit connected to the first side safety structure, and/or the system comprises a second tensioning unit connected to the second side safety structure. The first tensioning unit is configured for irreversibly tensioning the first side safety structure and the second safety structure in relation to the vehicle body structure in a vehicle impact event for minimizing play between the vehicle body structure, the first side door, and the second side door. The second tensioning unit is configured for irreversibly tensioning the first side safety structure and the second safety structure in relation to the vehicle body structure in a vehicle impact event for minimizing play between the vehicle body structure, the first side door, and the second side door.

According to an aspect of the disclosure, the first tensioning unit comprises a first pyrotechnic tensioning device configured for tensioning the first side safety structure and the second safety structure in relation to the vehicle body structure, and/or the second tensioning unit comprises a second pyrotechnic tensioning device configured for tensioning the first side safety structure and the second safety structure in relation to the vehicle body structure. The pyrotechnic tensioning is providing an efficient and reliable tensioning of the system in a vehicle impact event.

According to another aspect of the disclosure, the first side safety structure is in a first end releasably connected to the first structural element via the first connection member, and in a second end connected to the connecting device. The second side safety structure is in a first end connected to the connecting device, and in a second end releasably connected to the second structural element via the second connection member. The connections are providing an efficient coupling between the system parts, and also allowing opening of the doors.

According to a further aspect of the disclosure, the first side safety structure is connected to the connecting device via a safety release system. The safety release system is arranged between the first side safety structure and the connecting device, and the safety release system is configured for releasing a connection between the first side safety structure and the connecting device after a vehicle impact event. With the safety release system, opening of the side doors after a side impact event is enabled and simplified.

According to an aspect of the disclosure, the safety release system comprises a releasing mechanism and a releasing member detachably arranged in relation to each other. The safety release system is configured for being arranged in a first state where the releasing mechanism and the releasing member are connected to each other and a second state where the releasing mechanism and the releasing member are disconnected from each other. Through the detachable arrangement of the releasing mechanism and the releasing member from each other, the side doors can be opened without using the connecting device. By changing the safety release system from the first state where the releasing mechanism and the releasing member are connected, to the second state where the releasing mechanism and the releasing member are disconnected from each other, opening of the side doors is enabled.

According to another aspect of the disclosure, the releasing mechanism comprises a hook member and the releasing member comprises a hook receiving opening. The hook member is configured for being engaged with the hook receiving opening in the first state and configured for being disengaged from the hook receiving opening in the second state. The hook member is configured for pivoting from an engaged position in the first state to a disengaged position in the second state. The hook member and the hook receiving opening are efficiently cooperating for disengaging the connection of the releasing mechanism after the vehicle impact event. The pivoting function is suitable for a secure disengagement of the hook member from the hook receiving opening.

According to a further aspect of the disclosure, the releasing mechanism comprises a safety pin configured for preventing displacement of the hook member from the engaged position to the disengaged position in the first state. The safety pin is configured for allowing displacement of the hook member from the engaged position to the disengaged position in the second state. The safety pin is securing unintended or unwanted displacement of the hook member from the engaged position to the disengaged position.

According to an aspect of the disclosure, the releasing mechanism comprises an actuating unit connected to the safety pin. The actuating unit is configured for displacing the safety pin from a locked position to an unlocked position in the second state. The actuating unit is providing an efficient way to move the locking pin to the unlocked position, which in turn is allowing the movement of the hook member.

According to another aspect of the disclosure, the first side safety structure is movably arranged in relation to the first side door, and the second side safety structure is movably arranged in relation to the second side door. The movably arranged side safety structures are allowing an efficient capturing of impact energy, and is preventing major deformations of the side doors in a vehicle impact event for protecting occupants of the vehicle.

According to a further aspect of the disclosure, the first structural element is arranged forward of the door opening in a longitudinal direction of the vehicle, and the second structural element is arranged rearward of the door opening in the longitudinal direction.

According to an aspect of the disclosure, the first structural element is an A-pillar of the vehicle body structure, and that the second structural element is a C-pillar of the vehicle body structure. The connections to the A-pillar and the C-pillar respectively are providing a strong and robust construction of the side impact restraint protection system.

According to another aspect of the disclosure, the first side safety structure is arranged as a beam structure in the first side door, a flexible strap structure in the first side door, or a membrane structure integrated in an outer door panel of the first side door. The second side safety structure is arranged as a beam structure in the second side door, a flexible strap structure in the second side door, or a membrane structure integrated in an outer door panel of the second side door. There are thus different possibilities for designing the side safety structures, and the construction may vary with the design of the vehicle.

According to a further aspect of the disclosure, the system comprises a first pair of the first side safety structure and the second side safety structure, and a second pair of the first side safety structure and the second side safety structure, arranged in the first side door and the second side door respectively. The pair of side safety structures is used for further increasing the safety of the system for preventing major deformations of the side doors in a vehicle impact event.

BRIEF DESCRIPTION OF THE DRAWINGS

The disclosure will be described in detail in the following, with reference to the attached drawings, in which FIGS. 4A-4B show schematically, in a view from above and in a side view, the connecting device in the connected position, and the safety release system in an unlocked and disengaged position, according to the disclosure, FIGS. 7A-7C show schematically, in a perspective view and in side views, a tensioning device, according to the disclosure.

DETAILED DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

Figure 1A:
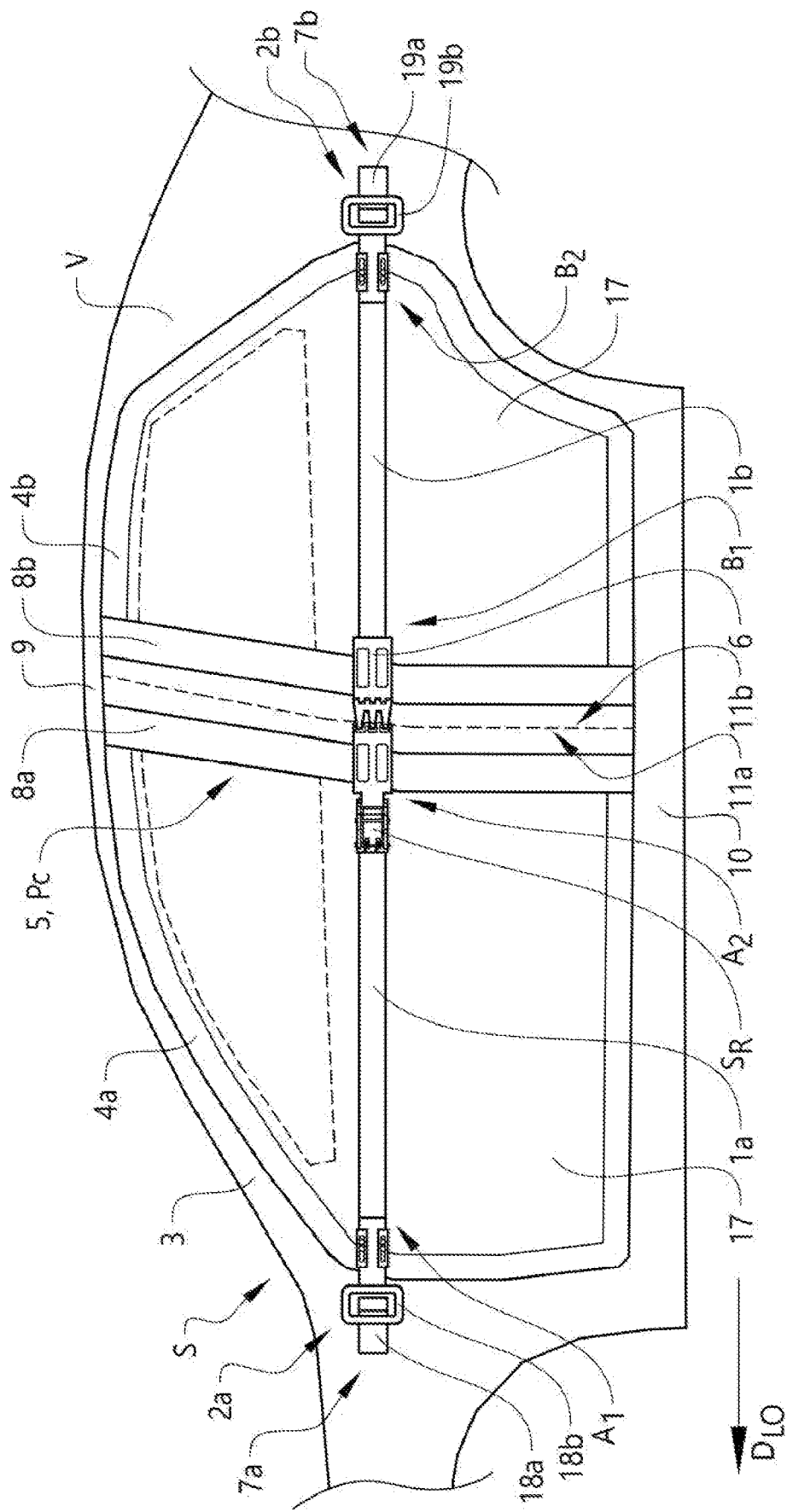
FIGS. 1A-1C show schematically, in side views, embodiments of a side impact restraint protection system, according to the disclosure.
Figure 1B:
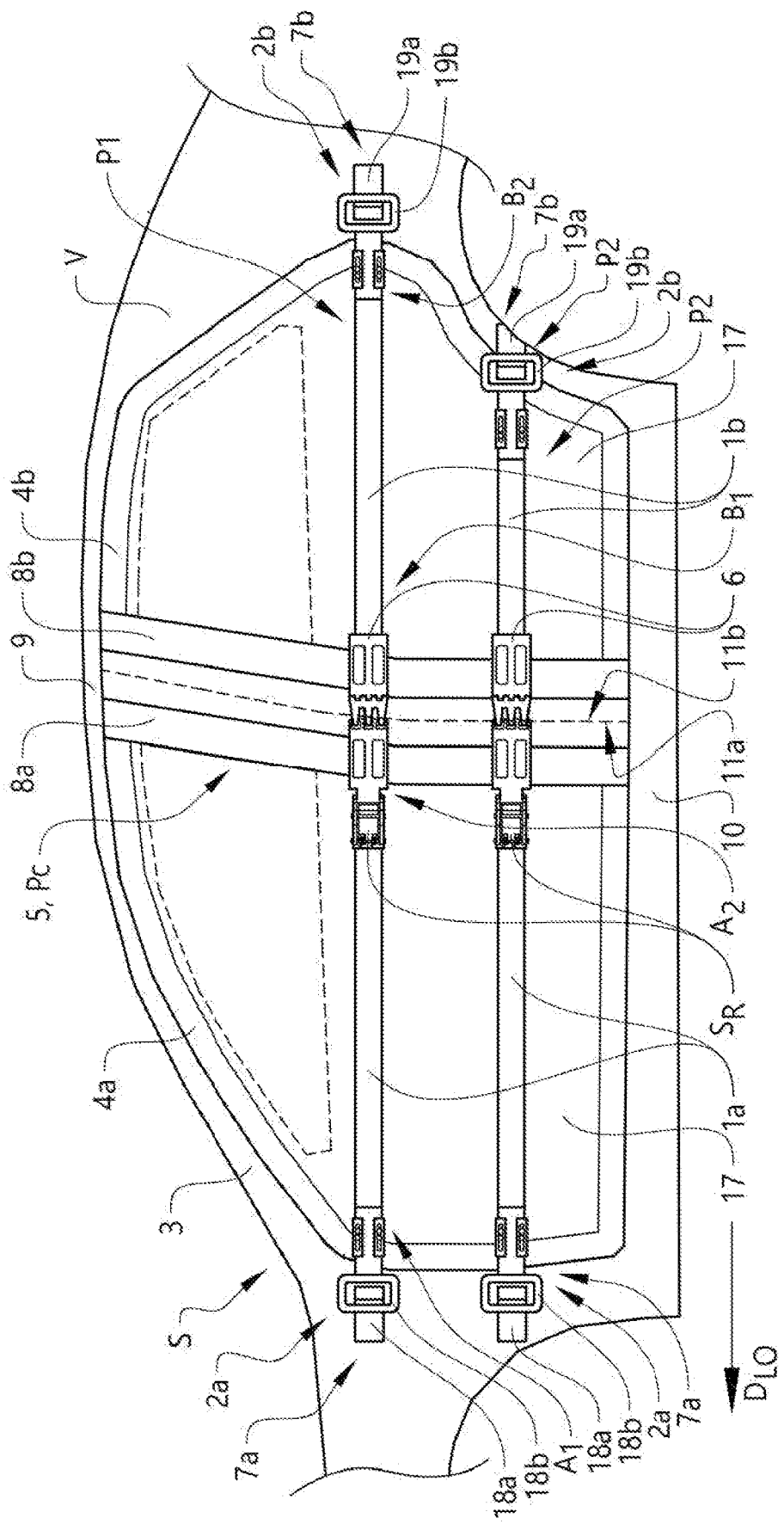
Figure 1C:
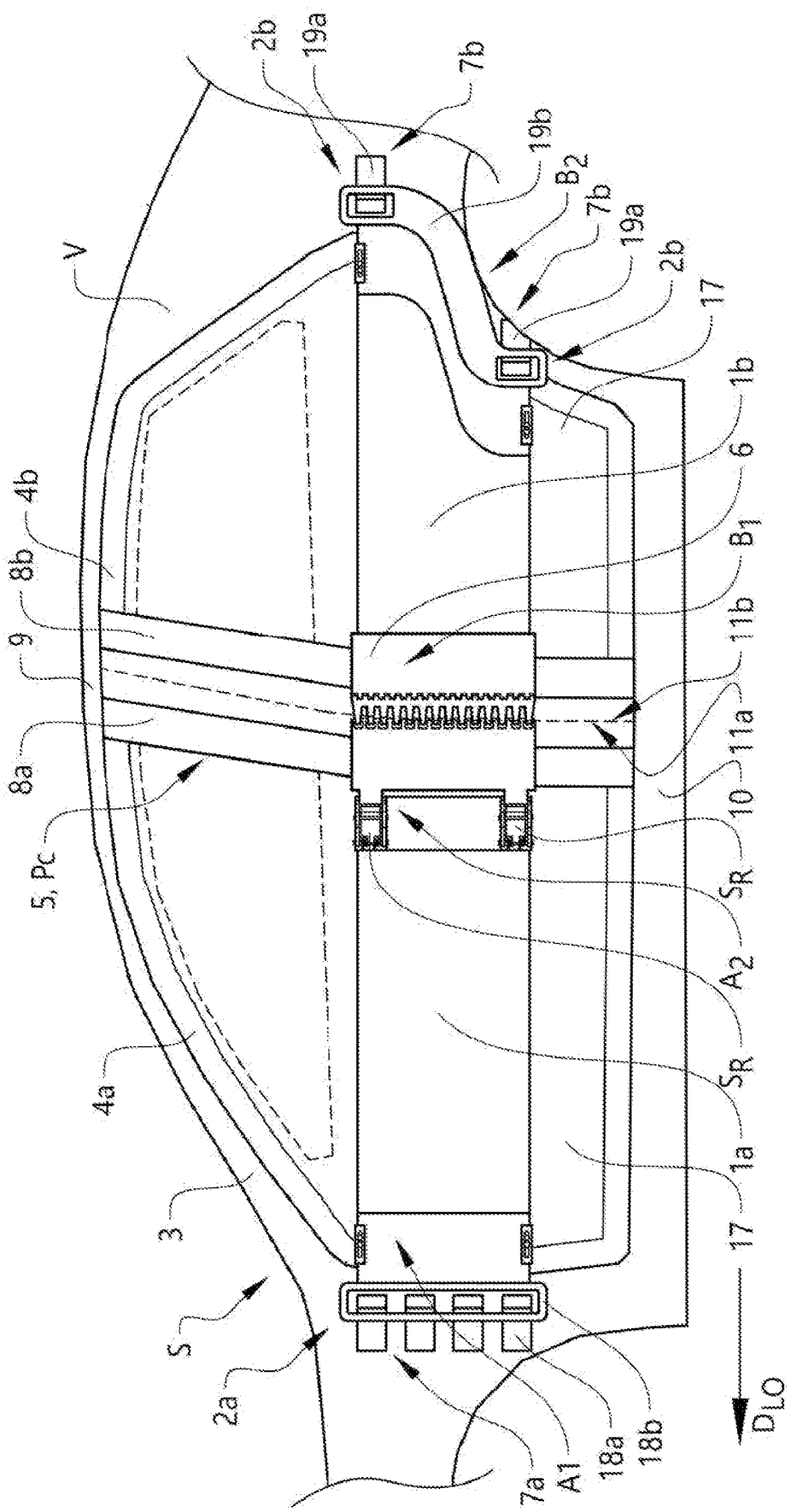

FIG. 1A-1C schematically show embodiments of a side impact restraint protection system S for a vehicle V. The side impact restraint protection system S comprises a first side safety structure $1a$, a second side safety structure $1b$, a first structural element $2a$ of a vehicle body structure 3 of the vehicle V, and a second structural element $2b$ of the vehicle body structure 3. The first side safety structure $1a$ is arranged in connection to a first side door $4a$ of the vehicle V, and the second side safety structure $1b$ is arranged in connection to a second side door $4b$ of the vehicle V. The first side door $4a$ and the second side door $4b$ are arranged to cover a common single door opening 5 of the vehicle body structure 3 in a closed door position $P_C$. The first structural element $2a$ is arranged in a position in front of the door opening 5 in a longitudinal direction $D_{LO}$ of the vehicle V, and the second structural element $2b$ arranged in a position behind the door opening 5 in the longitudinal direction $D_{LO}$. In the closed door position $P_C$, the first side safety structure $1a$ and the second side safety structure $1b$ are configured to be releasably connected to each other via a connecting device 6. The first side safety structure $1a$ is configured to be connected to the first structural element $2a$ via a first connection member $7a$, and the second side safety structure $1b$ is configured to be connected to the second structural element $2b$ via a second connection member $7b$.

As schematically illustrated in FIGS. 1A-1C, the first side safety structure $1a$ and the second side safety structure $1b$ are when connected to each other forming a structure that is extending in the respective side doors from the first structural element $2a$ of the vehicle body structure 3 to the second structural element $2b$ of the vehicle body structure 3. In the embodiments illustrated in FIGS. 1A-1C, the side safety structures are together forming a strap-like or membrane-like safety member extending over the door opening 5 for protecting the occupants of the vehicle V in a side impact event. Through the secure connection to the first structural element $2a$ and the second structural element $2b$, the connected first side safety structure $1a$ and the second side safety structure $1b$ are cooperating to absorb crash energy in a vehicle impact event. The crash energy is in this way efficiently transferred from the side doors during the vehicle impact event to the respective side safety structures and the vehicle body structure 3 through the secure connection between the first structural element $2a$, the first side safety structure $1a$, the second side safety structure $1b$, and the second structural element $2b$. In this way, the side doors are cooperating with the car body structure 3 for absorbing energy.

The vehicle V is suitably configured with a control unit for controlling the different functions of the side impact restraint protection system S. The control unit may for example be connected to sensors for detecting the vehicle impact event and further connected to parts of the system for determining the functionality and status of components involved. Suitable sensors may be used for the detections and determinations needed. Furthermore, the control unit may also be connected to sensors configured to detect and track vehicles or objects surrounding the vehicle V for predicting the vehicle impact event.

The first side door 4a and the second side door 4b are in the illustrated embodiments in FIGS. 1A-1C arranged to cover a common single door opening 5 of the vehicle body structure 3 in a closed door position $P_C$. As shown in FIGS. 1A-1C, the first side door 4a is a front vehicle side door and the second side door 4b is a rear vehicle side door. The common single door opening 5 is arranged without a B-pillar, and the side doors can be opened and closed in relation to the door opening 5 of the vehicle body structure 3 by suitable opening and closing mechanisms. The first structural element 2a is thus arranged forward of the door opening 5 in a longitudinal direction $D_{LO}$ of the vehicle V. The first structural element 2a may be any suitable part of the vehicle body structure 3. In the illustrated embodiments in FIGS. 1A-1C, the first structural element 2a is the A-pillar, or the A-pillar extension, of the vehicle body structure 3. The second structural element 2b is arranged rearward of the door opening 5 in the longitudinal direction $D_{LO}$ of the vehicle V. The second structural element 2b may be any suitable part of the vehicle body structure 3. In the illustrated embodiments, the second structural element 2b is the C-pillar, or the C-pillar extension, of the vehicle body structure 3. As shown in FIGS. 1A-1C, the first connection member 7a is arranged in connection to the A-pillar of the vehicle body structure 3, and the second connection member 7b is arranged in connection to the C-pillar of the vehicle body structure 3.

In the closed door position $P_C$, as illustrated in FIGS. 1A-1C, the first side safety structure 1a and the second side safety structure 1b are releasably connected to each other via the connecting device 6. The first side safety structure 1a is connected to the first structural element 2a of the vehicle body structure 3 via the first connection member 7a, and the second side safety structure 1b is connected to the second structural element 2b of the vehicle body structure 3 via the second connection member 7b.

As shown in FIGS. 1A-1C, the first side safety structure 1a is in a first end $A_1$ releasably connected to the first structural element 2a via the first connection member 7a, and in a second end $A_2$ connected to the connecting device 6 via a safety release system $S_R$. The side impact restraint protection system S in the illustrated embodiments thus comprises the safety release system $S_R$. The second side safety structure 1b is in a first end $B_1$ connected to the connecting device 6 and in a second end $B_2$ releasably connected to the second structural element 2b via the second connection member 7b.

Figure 6A:
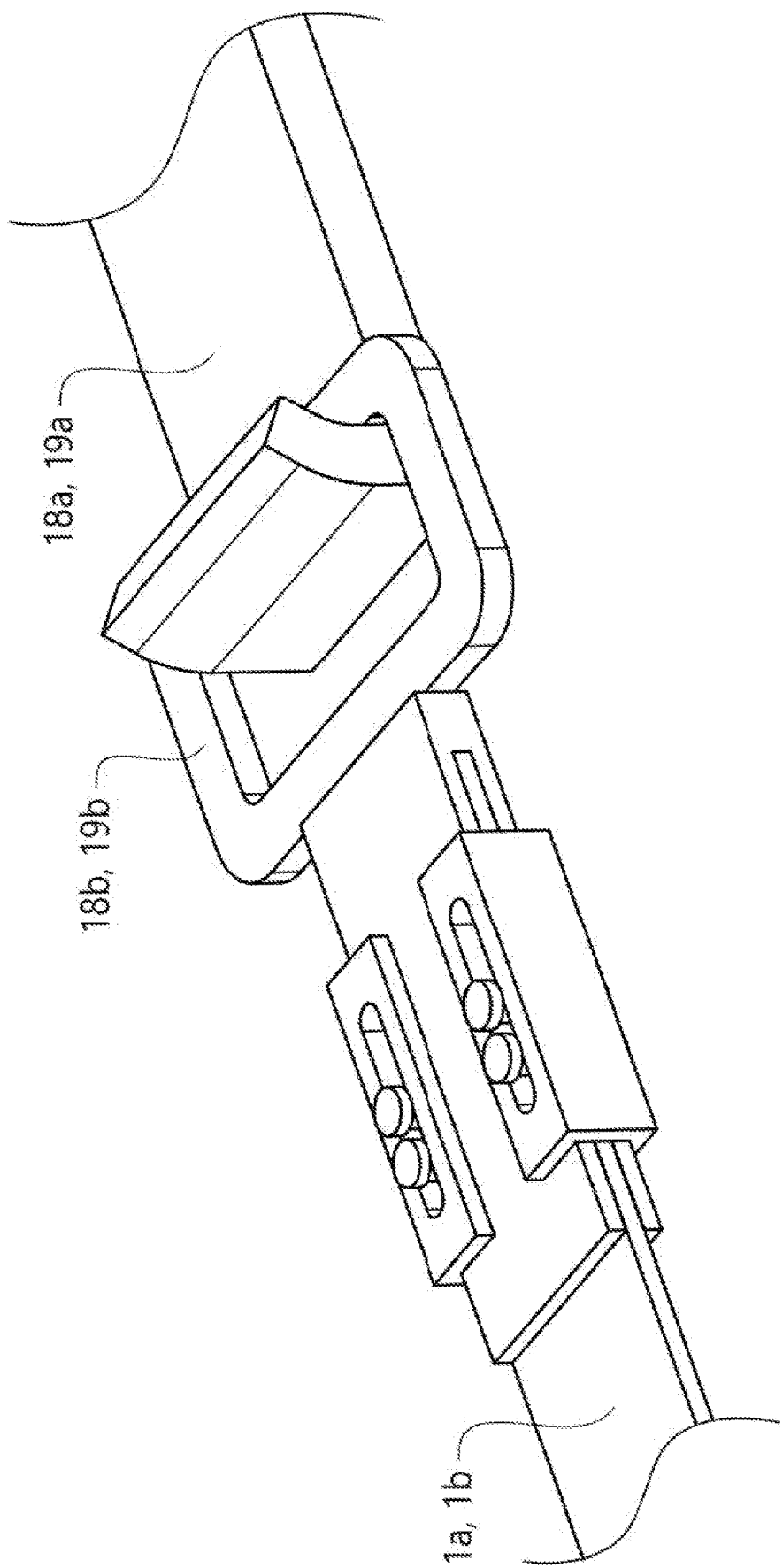
FIGS. 6A-6C show schematically, in a perspective view, a view from above, and in a side view, a connection member of the side impact restraint protection system.
Figure 6B:
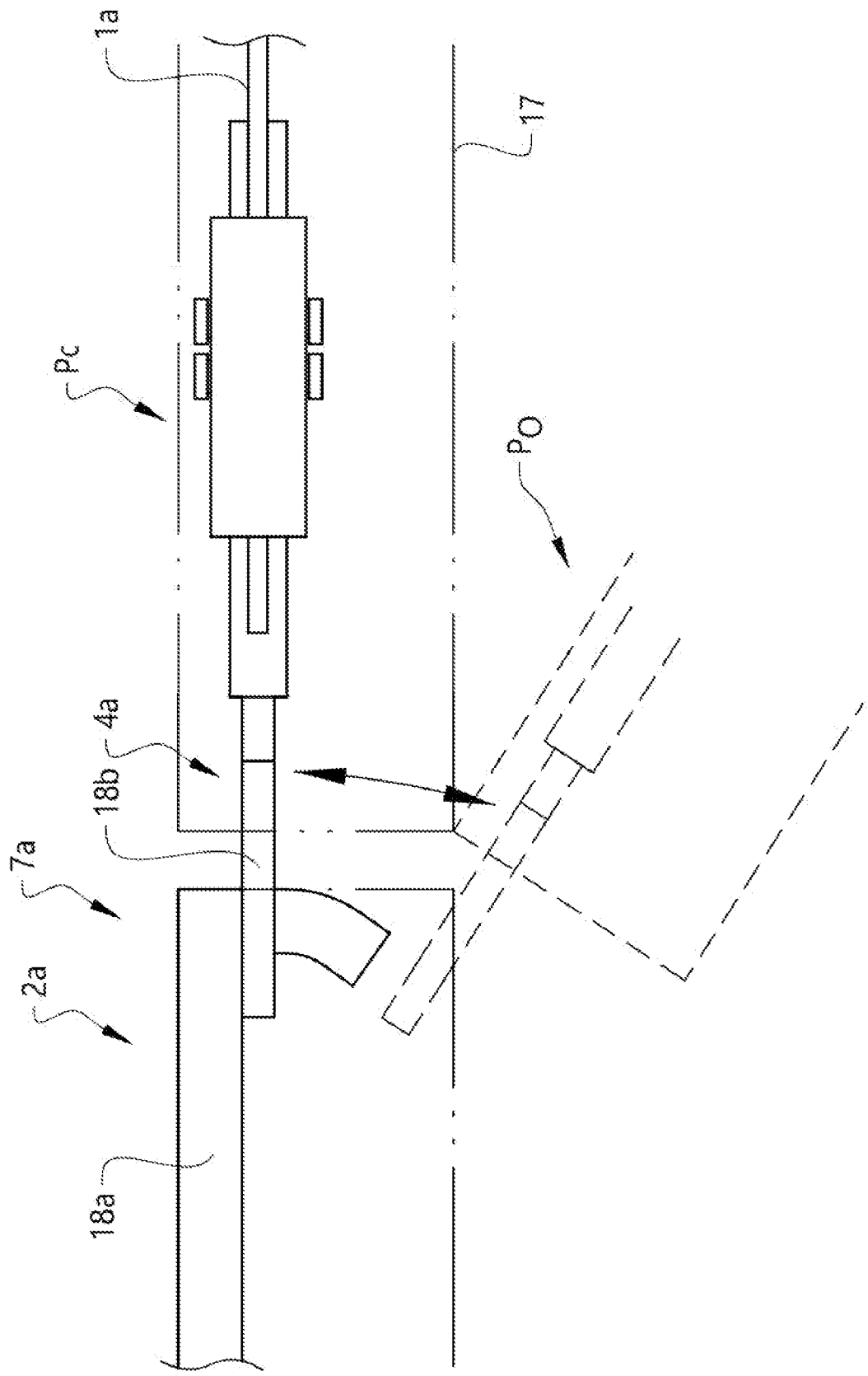
Figure 6C:
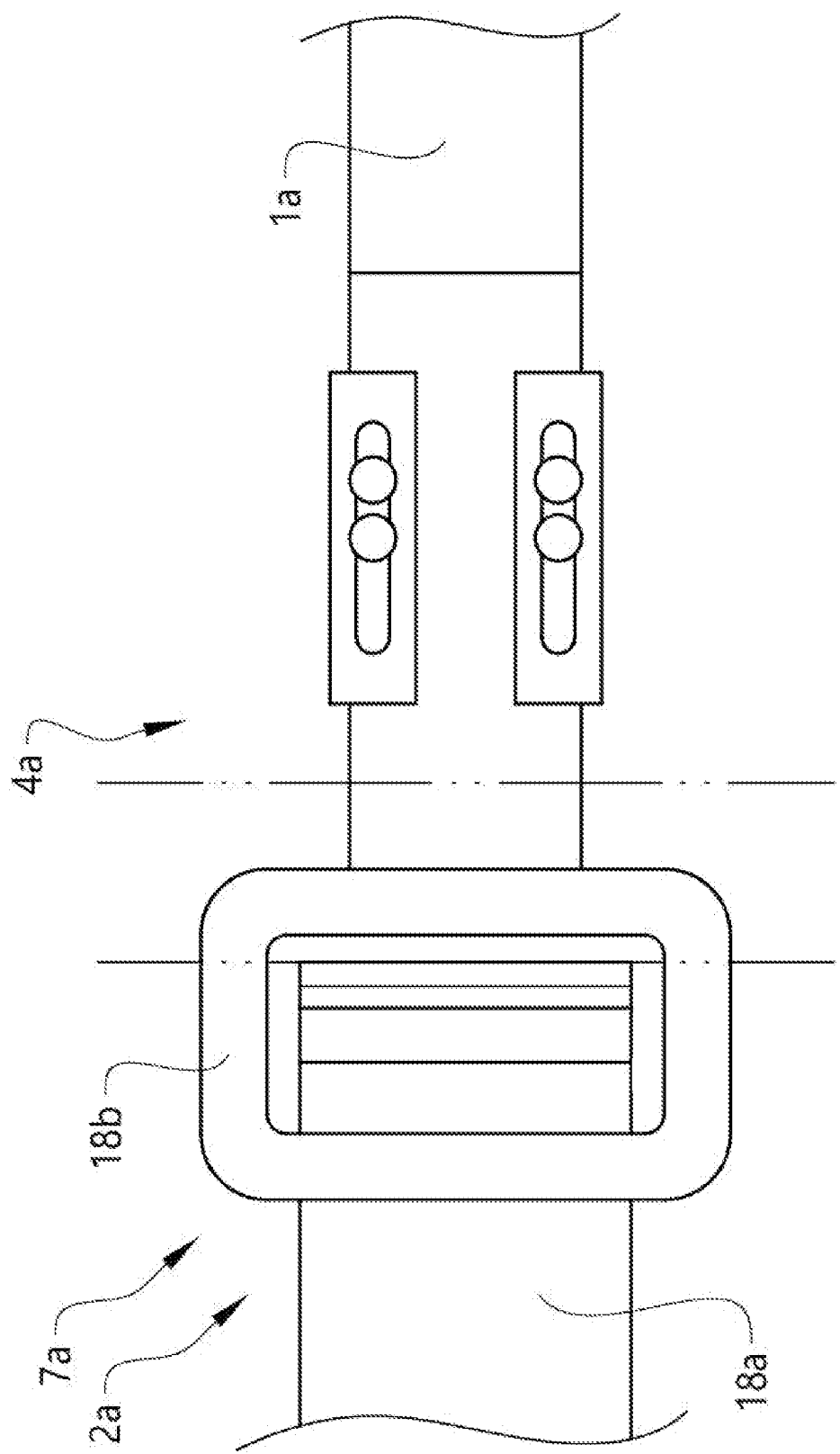

The first connection member 7a may for example be arranged as a first hook structure 18a and a cooperating first opening structure 18b, as schematically shown in FIGS. 1A-1C and 6A-6C. The first hook structure 18a is securely attached to the vehicle body structure 3 with suitable fastening means, such as for example screws, rivets or welds. The first opening structure 18b is securely attached to the first side safety structure 1a with suitable attachment means. When the first side door 4a is in the closed door position $P_C$, the first hook structure 18a is engaging the first opening structure 18b for a secure attachment of the first side safety structure 1a to the vehicle body structure 3. When the first side door 4a is opened, as indicated with dotted lines in FIG. 6B, the first opening structure 18b may be disengaged from the first hook structure 18a for an efficient opening of the first side door 4a. When the first side door 4a is moved from an open door position $P_O$ back to the closed door position $P_C$, the first hook structure 18a is securely engaging the first opening structure 18b. The configuration of the first connection member 7a of the embodiments shown in FIGS. 1A and 1B are illustrated more in detail in FIGS. 6A-6C, where the first hook structure 18a and the first opening structure 18b are illustrated. In FIG. 6B, the structures are shown both in the closed door position $P_C$, and in an open door position $P_O$. The first connection member 7a of the embodiment shown in FIG. 1C may instead comprise two or more of first hook structures 18a, where the respective hook structures are cooperating with a corresponding first opening structure 18b.

The second connection member 7b of the different embodiments may have a similar configuration as the first connection member 7a described above. The second connection member 7b may for example be arranged as a second hook structure 19a and a cooperating second opening structure 19b, as schematically shown in FIGS. 1A-1C. The second hook structure 19a is securely attached to the vehicle body structure 3 with suitable fastening means, such as for example screws, rivets or welds. The second opening structure 19b is securely attached to the second side safety structure 1b with suitable attachment means. When the second side door 4b is in the closed door position $P_C$, the second hook structure 19a is engaging the second opening structure 19b for a secure attachment of the second side safety structure 1b to the vehicle body structure 3. When the second side door 4b is opened, the second opening structure 19b may be disengaged from the second hook structure 19a for an efficient opening of the second side door 4b, in a similar way as discussed in connection to FIG. 6B above. When the second side door 4b is moved from an open door position back to the closed door position $P_C$, the second hook structure 19a is securely engaging the second opening structure 19b.

The hook structures of the different embodiments are suitably made of a strong and rigid material and firmly connected to the respective structural elements, for a secure connection of the side safety structures. The opening structures are suitably made of a strong and rigid material for a secure connection to the respective hook structures. Suitable materials are for example metals, metallic materials, composite materials, or a combination of different materials.

The first side safety structure 1a may be arranged as a beam structure in the first side door 4a, a flexible strap structure in the first side door 4a, or a membrane structure integrated in the first side door 4a, for example in connection to or integrated in an outer door panel 17 of the first side door 4a. The second side safety structure 1b may be arranged as a beam structure in the second side door 4b, a flexible strap structure in the second side door 4b, or a membrane structure integrated in the second side door 4b, for example in connection to or integrated in an outer door panel 17 of the second side door 4b.

The first side safety structure 1a is suitably arranged as a thin flexible structural member, as schematically illustrated in for example FIGS. 1A-1C, 2A-2C, 3A-3B, and 4A-4B, where the first side safety structure 1a is having a flat strap-like configuration. In the embodiment illustrated in FIG. 1C, the first side safety structure 1a is having a thin membrane configuration. The first side safety structure 1a is for example made of a thin steel band, or alternatively from a thin structural member made of strong composite materials, polymers, or suitable fiber structures. The first side safety structure 1a is thin and lightweight in construction compared to traditional door beams for a compact and weight-saving side door construction. The first side safety structure 1a is suitably movably arranged in relation to the first side door 4a, and the first side safety structure 1a is thus allowed to move in relation to the first side door 4a in a vehicle impact event. The first side door 4a may for example be arranged with an internal channel-like structure, or similar recessed structure, for efficiently holding the first side safety structure 1a in a movable relationship to the first side door 4a. With this configuration, the first side safety structure 1a is acting like a strap preventing deformation of the first side door 4a in a vehicle impact event for protecting occupants of the vehicle V.

The second side safety structure 1b is suitably arranged as a thin flexible structural member, as schematically illustrated in for example FIGS. 1A-1C, 2A-2C, 3A-3B, and 4A-4B, where the second side safety structure 1b is having a flat strap-like configuration. In the embodiment illustrated in FIG. 1C, the second side safety structure 1c is having a thin membrane configuration. The second side safety structure 1b is for example made of a thin steel band, or alternatively from a thin structural member made of strong composite materials, polymers, or suitable fiber structures. The second side safety structure 1b is thin and lightweight in construction compared to traditional door beams for a compact and weight-saving side door construction. The second side safety structure 1b is suitably movably arranged in relation to the second side door 4b, and the second side safety structure 1b is thus allowed to move in relation to the second side door 4b in a vehicle impact event. The second side door 4b may for example be arranged with an internal channel-like structure, or similar recessed structure, for efficiently holding the second side safety structure 1b in a movable relationship to the second side door 4b. With this configuration, the second side safety structure 1b is acting like a strap preventing deformation of the second side door 4b in a vehicle impact event for protecting occupants of the vehicle V.

In the embodiment illustrated in FIG. 1B, the side impact restraint protection system S comprises a first pair P1 of the first side safety structure 1a and the second side safety structure 1b, and a second pair P2 of the first side safety structure 1a and the second side safety structure 1b, arranged in the first side door 4a and the second side door 4b respectively.

In the embodiment illustrated in FIG. 1C, the side impact restraint protection system S comprises the first side safety structure 1a and the second side safety structure 1b arranged as membrane structures, as described above. This embodiment is similar in construction to the system illustrated in FIG. 1A, but the safety structures are having wider extensions.

The side impact restraint protection system S according to the embodiments illustrated in FIGS. 1A-1C comprises a first door beam 8a arranged in the first side door 4a. The first door beam 8a is extending between a roof beam structure 9 and a sill structure 10 of the vehicle body structure 3 when the first side door 4a is arranged in the closed door position $P_C$. The first side door 4a may be connected to the roof beam structure 9 and/or the sill structure 10 with suitable connection or locking devices for holding the door in the closed door position $P_C$. The side impact restraint protection system S further comprises a second door beam 8b arranged in the second side door 4b. The second door beam 8b is extending between the roof beam structure 9 and the sill structure 10 of the vehicle body structure 3 when the second side door 4b is arranged in the closed door position $P_C$. The second side door 4b may be connected to the roof beam structure 9 and/or the sill structure 10 with suitable connection or locking devices for holding the door in the closed door position $P_C$. The first door beam 8a and the second door beam 8b are configured for replacing the B-pillar of the vehicle body structure 3, allowing a strong structural construction of the vehicle V with the common single door opening 5. The first door beam 8a is arranged in connection to a rear edge 11a of the first side door 4a, and the second door beam 8b is arranged in connection to a front edge 11b of the second side door 4b. The door beams may have any suitable configuration and construction for providing a strong structure for the side impact restraint protection system, and be made of any suitable materials, such as steel, other metals, metallic materials, composite materials, or a combination of different materials.

Figure 3A:
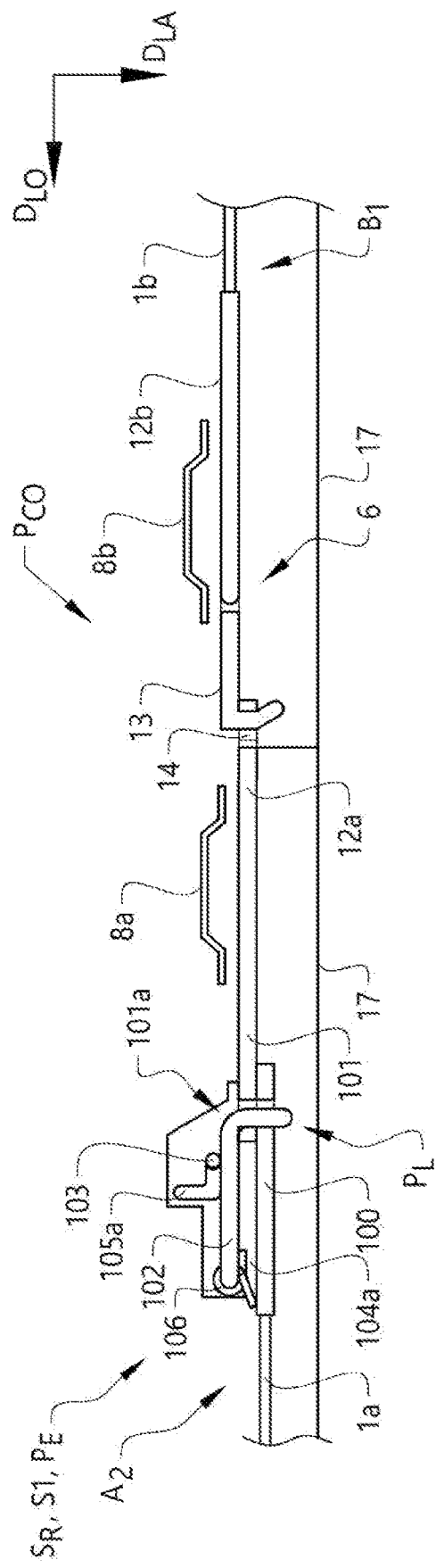
FIGS. 3A-3B show schematically, in a view from above and in a side view, the connecting device in a connected position, and the safety release system in a locked and engaged position, according to the disclosure.

As illustrated in FIGS. 3A and 4A, the first side safety structure 1a with the connecting device 6 is in a lateral direction $D_{LA}$ of the vehicle V arranged outside of the first door beam 8a, and the second side safety structure 1b with the connecting device 6 is in the lateral direction $D_{LA}$ arranged outside of the second door beam 8b, for a safe construction of the side impact restraint protection system S. In an alternative non-illustrated embodiment, the first side safety structure 1a with the connecting device 6 is instead arranged inside of the first door beam 8a in the lateral direction $D_{LA}$ and the second side safety structure 1b with the connecting device 6 inside of the second door beam 8b in the lateral direction $D_{LA}$. In a further non-illustrated embodiment, the first safety structure 1a with the connecting device 6 is extending through the first door beam 8a, and the second side safety structure 1b with the connecting device 6 is extending through the second door beam 8b. It should be understood that instead of two door beams, the door construction could alternatively be arranged with only one door beam arranged in the first side door 4a or the second side door 4b.

Figure 2A:
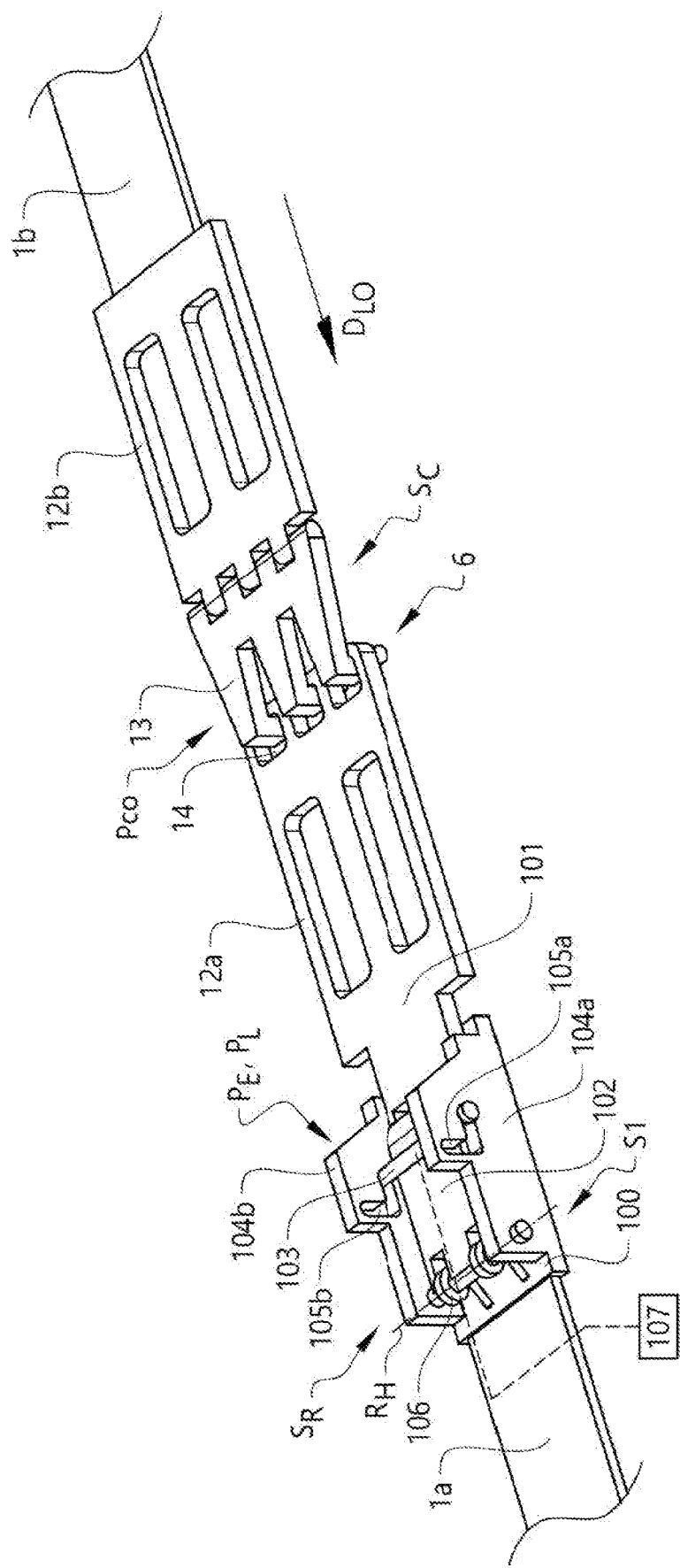
FIGS. 2A-2C show schematically, in perspective views, different operating positions of a connecting device and a safety release system of the side impact restraint protection system, according to the disclosure.
Figure 2B:
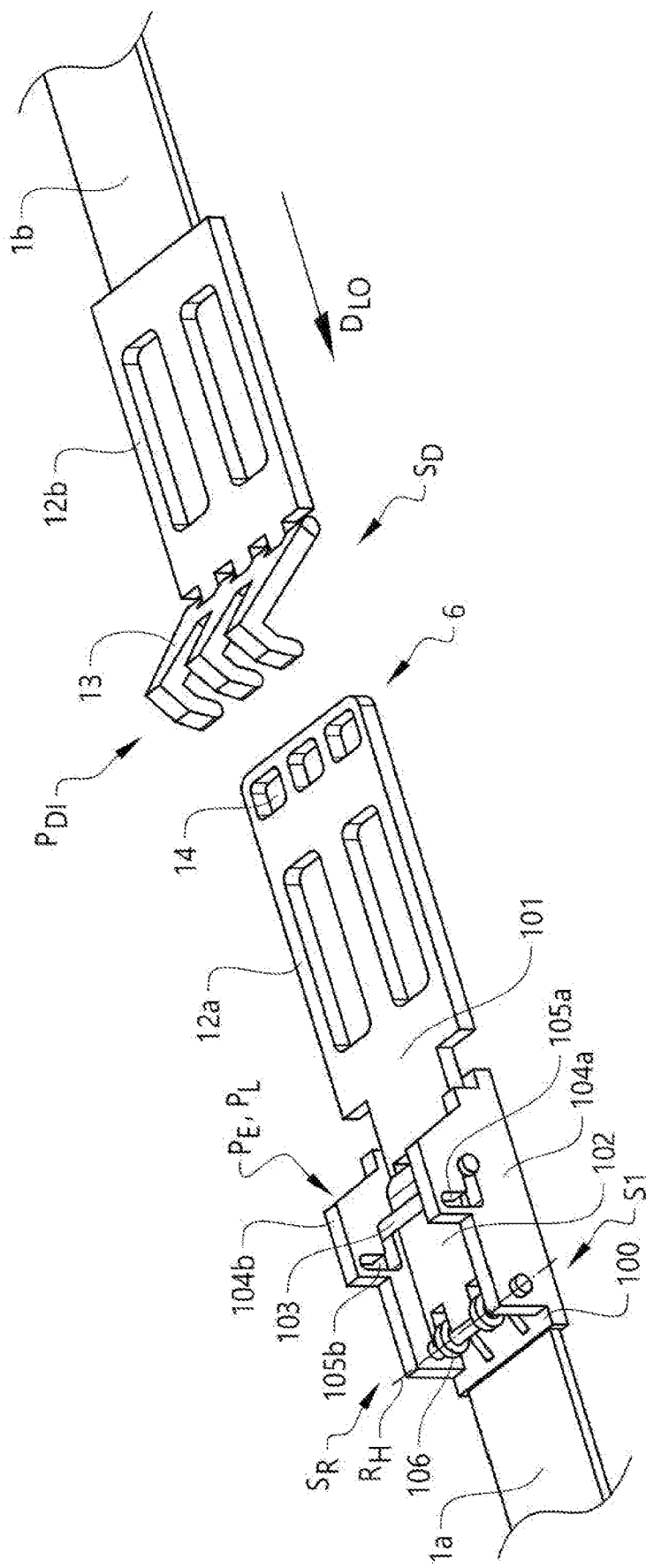
Figure 2C:
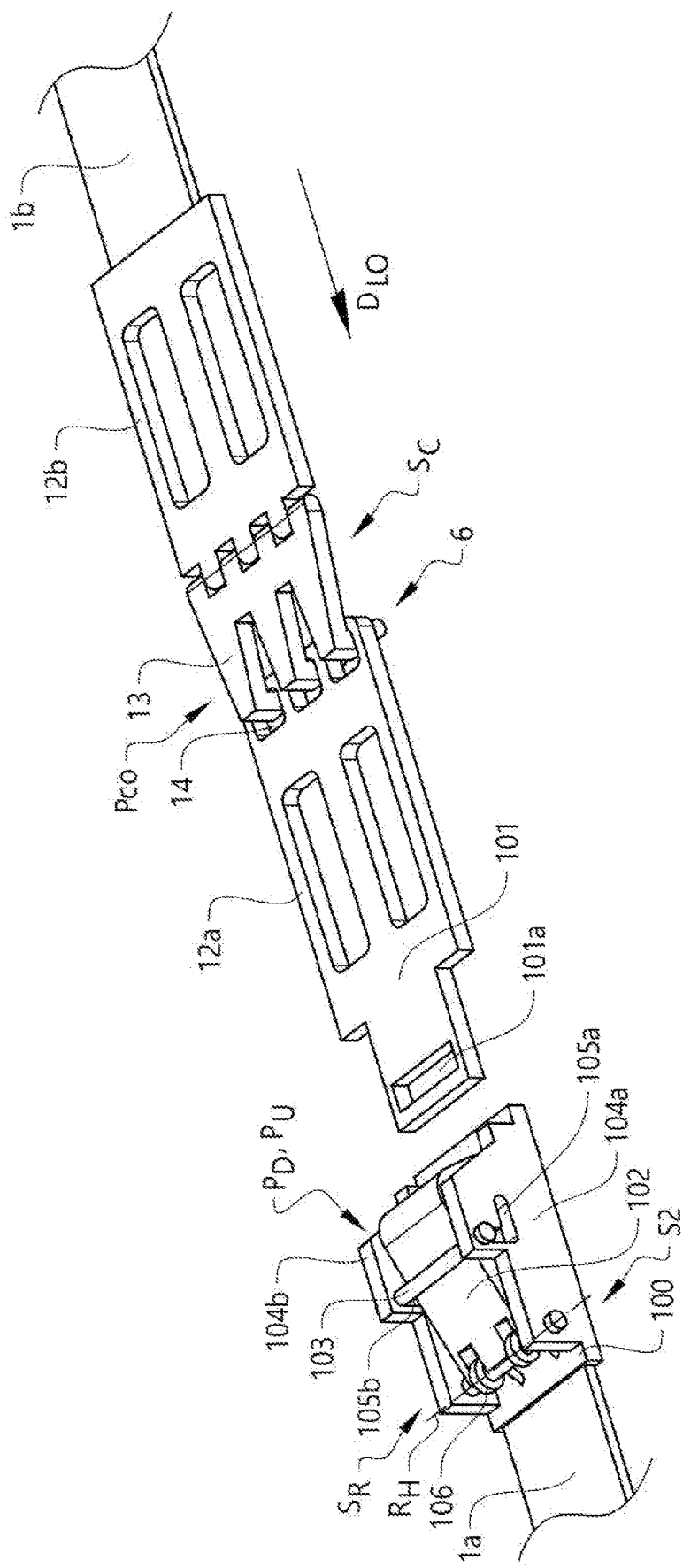

As illustrated in FIGS. 2A-2B, 3A-3B, 4A-4B, the connecting device 6 comprises a first connector part 12a connected to the first side safety structure 1a via the safety release system $S_R$. It should however be understood that the side impact restraint protection system S in alternative non-illustrated embodiments may be arranged without the safety release system $S_R$, and then the first connector part 12a instead is directly connected to the first side safety structure 1a. The illustrated connecting device 6 in FIGS. 2A-2B, 3A-3B and 4A-4B is having the configuration shown in FIGS. 1A and 1B. The connecting device in FIG. 1C is having a similar construction but a wider extension. The connecting device 6 further comprises a second connector part 12b connected to the second side safety structure 1b. The first connector part 12a and the second connector part 12b are configured for releasably connecting the first side safety structure 1a and the second side safety structure 1b to each other. The connecting device 6 is configured for being arranged in a connected state $S_C$ where the first connector part 12a and the second connector part 12b are connected to each other, as shown in FIGS. 2A and 2C, and a disconnected state $S_D$ where the first connector part 12a and the second connector part 12b are disconnected from each other, as shown in FIG. 2B. The connected state $S_C$ is used when the side doors are arranged in the closed door position $P_C$ for a secure connection between the first side safety structure 1a and the second side safety structure 1b. The disconnected state $S_D$ is allowing opening of the first side door 4a and/or the second side door 4b. A control unit may be used for controlling the states of the connecting device 6. In the illustrated embodiment, the first connector part 12a comprises hook openings 14, and the second connector part 12b comprises a hook 13 with a plurality of hook elements. The hook 13 is in engagement with the hook openings 14 in the connected state $S_C$, as shown in FIG. 2A, and configured for being disengaged from the hook openings 14 in the disconnected state $S_D$, as shown in FIG. 2B. In the connected state $S_C$, the first side safety structure 1a and the second side safety structure are securely connected to each other through the interaction between the hook 13 and the hook openings 14. The hook 13 is configured for pivoting between a connected position $P_{CO}$ in the connected state $S_C$ and a disconnected position $P_{DI}$ in the disconnected state $S_D$, as shown in FIGS. 2A-2B, and the hook 13 may for example be pivotably connected to the second connector part 12b via a hinged member, a pivot axis or other suitable pivoting mechanism. The pivoting movement between the connected position $P_{CO}$ and the disconnected position $P_{DI}$ may be achieved with for example a suitable actuating mechanism or an actuating mechanism together with a spring arrangement. A suitable actuator is for example an electric motor, a solenoid-type actuator, or other suitable linear or rotary actuators. In an alternative non-illustrated embodiment, the first connector part 12a may instead comprise the hook 13 and the second connector part 12b the hook openings 14.

Figure 5:
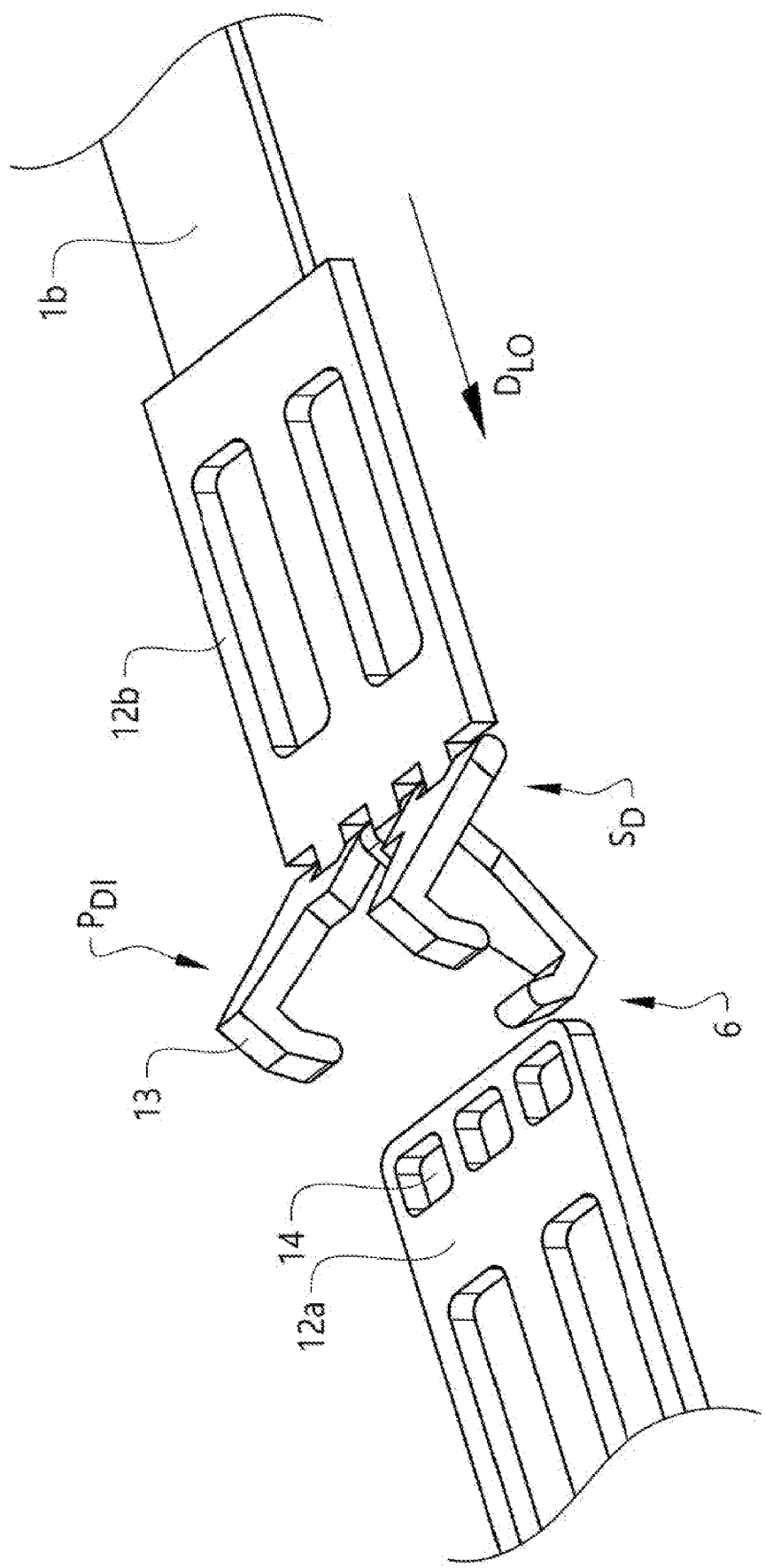
FIG. 5 shows schematically in a perspective view, an alternative embodiment of the connecting device according to the disclosure.

An alternative embodiment of the connecting device 6 is schematically shown in FIG. 5. In this embodiment, the hook 13 is instead configured with oppositely arranged hook elements for a firm connection between the hook 13 and the corresponding hook openings 14. The oppositely arranged hook elements are configured for moving in different directions between the connected position $P_{CO}$ and the disconnected position $P_{DI}$.

In the embodiments illustrated in FIGS. 2A-2C, 3B, 4B, and 5, the hook 13 comprises three hook elements. The hook 13 may alternatively comprise only one single hook element, two hook elements, or more than three hook elements if suitable, depending on the construction and design of the connecting device. A connecting device 6 with a plurality of hook elements are schematically indicated in FIG. 1C. The connecting device 6 may comprise a corresponding number of hook openings 14 to match the configuration of the hook 13.

Figure 7A:
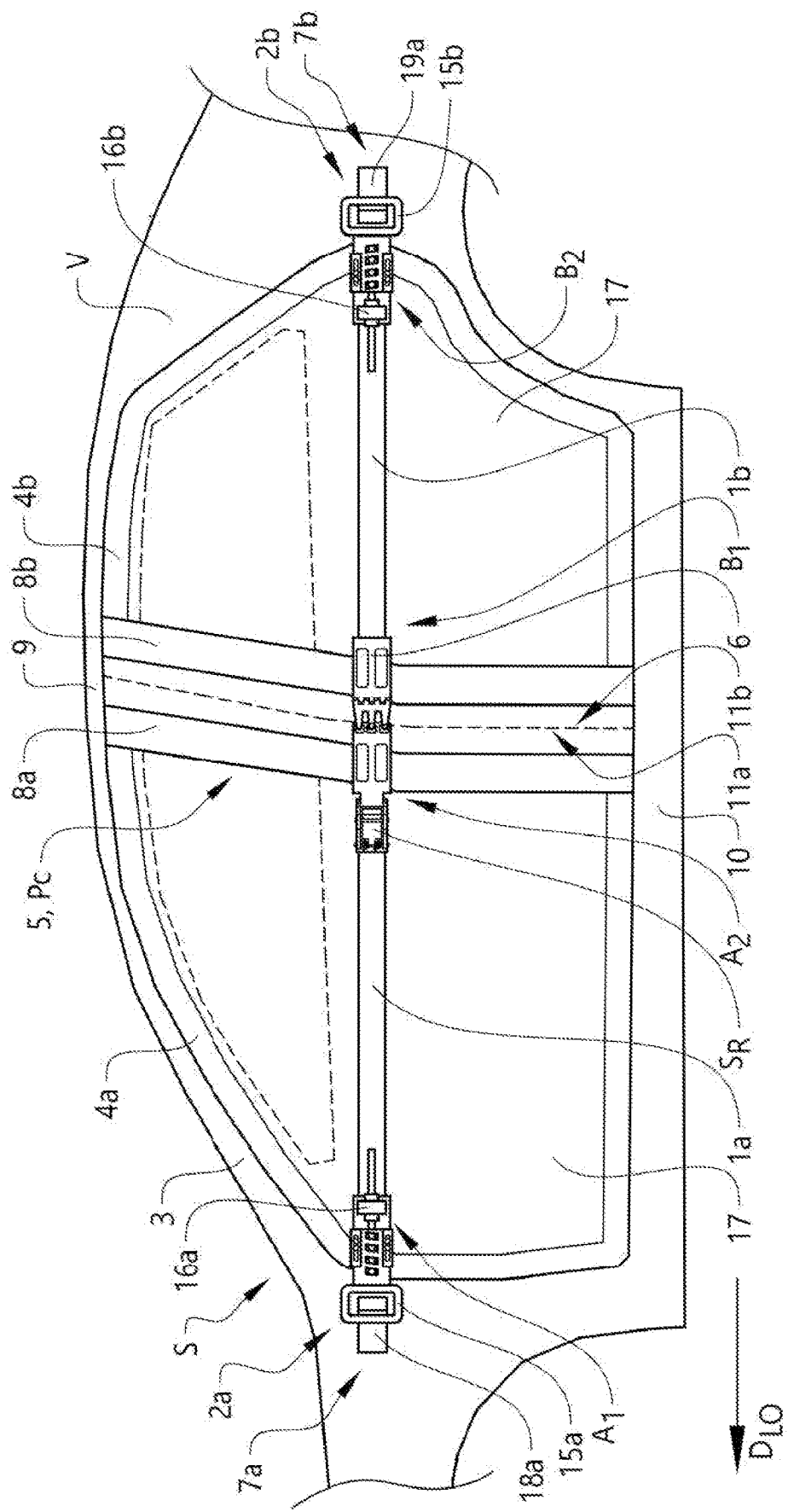

In the embodiment illustrated in FIG. 7A, the side impact restraint protection system S comprises a first tensioning unit 15a connected to the first side safety structure 1a, where the first tensioning unit 15a is replacing the first opening structure 18b described above. The first tensioning unit 15a is configured for irreversibly tensioning the first side safety structure 1a and the second safety structure 1b in relation to the vehicle body structure 3 in a vehicle impact event for minimizing play between the vehicle body structure 3, the first side door 4a, and the second side door 4b. The first tensioning unit 15a may comprise a first pyrotechnic tensioning device 16a configured for tensioning the first side safety structure 1a and the second safety structure 1b in relation to the vehicle body structure 3. The first tensioning unit 15a may have any suitable configuration, and it should be understood that the first tensioning unit 15a could have a design and construction similar to tensioning devices used in seat belt restraint systems, such as for example a seat belt pyrotechnic pre-tensioner. Other tensioning devices than pyrotechnical may also be used in other embodiments.

In the embodiment illustrated in FIGS. 7A-7C, the first tensioning unit 15a is forming part of the first connection member 7a instead of the first opening structure 18b. The first tensioning unit 15a is securely attached to the first side safety structure 1a with suitable attachment means. The first tensioning unit 15a is arranged with a first part 20a comprising an opening 21, where the opening 21 is cooperating with the first hook structure 18a in a similar way as the opening structure 18b described above in connection to FIGS. 1A-1C and 6A-6C. When the first side door 4a is in the closed door position $P_C$, the first hook structure 18a is engaging the opening 21 for a secure attachment of the first side safety structure 1a to the vehicle body structure 3. When the first side door 4a is opened, the opening 21 may be disengaged from the first hook structure 18a for an efficient opening of the first side door 4a. When the first side door 4a is moved from an open door position $P_O$ back to the closed door position $P_C$, the first hook structure 18a is securely engaging the opening 21.

In a vehicle impact event, the first tensioning unit 15a is configured for being irreversibly displaced from an untensioned state $S_U$ to a tensioned state $S_T$. The states are suitably controlled by the control unit. The untensioned state $S_U$ is schematically shown in FIG. 7B and the tensioned state $S_T$ in FIG. 7C. When the first tensioning unit 15a is displaced from the untensioned state $S_U$ to the tensioned state $S_T$, the first side safety structure 1a together with the second side safety structure 1b is pulled in a direction towards the first hook structure 18a. The pulling action is established with the first pyrotechnic tensioning device 16a. The first tensioning unit 15a comprises the first part 20a in which the opening 21 is arranged, and a second part 20b to which the first side safety structure 1a is attached. The first part 20a and the second part 20b are slidably arranged in relation to each other. The first pyrotechnic tensioning device 16a comprises a main portion 22 that is connected to the second part 20b, and to a wire 23 that is extending from the main portion 22 to the first part 20a. The wire 23 is securely attached to the first part 20a. Upon displacement of the first tensioning unit 15a from the untensioned state $S_U$ to the tensioned state $S_T$, the first pyrotechnic tensioning device 16a is exerting a pulling action onto the wire 23 for displacing the first part 20a and the second part 20b in relation to each other from the untensioned state $S_U$, shown in FIG. 7B, to the tensioned state $S_T$, shown in FIG. 7C. The main portion 22 may comprise barbs or similar devices for holding the wire 23 in a tensioned position in the tensioned state $S_T$. In the tensioned state $S_T$, the first tensioning unit 15a is irreversibly tensioning the first side safety structure 1a and the second safety structure 1b in relation to the vehicle body structure 3 in a vehicle impact event for minimizing play between the vehicle body structure 3, the first side door 4a, and the second side door 4b.

The side impact restraint protection system S may instead of or in addition to the first tensioning unit 15a comprise a second tensioning unit 15b connected to the second side safety structure 1b, replacing the second opening structure 19b described above. In the embodiment illustrated in FIG. 7A, the side impact restraint protection system S comprises both the first tensioning unit 15a and the second tensioning unit 15b. However, the side impact restraint protection system S may in non-illustrated embodiments instead be arranged with only the first tensioning unit 15a or the second tensioning unit 15b. The second tensioning unit 15b is forming part of the second connection member 7b instead of the second opening structure 19b. The second tensioning unit 15b may have the same configuration and function as the first tensioning unit 15a, as illustrated in FIGS. 7B-7C. With such a configuration, the second tensioning unit 15b is arranged with an opening 21 that is cooperating with the second hook structure 19a, in a similar way as the second opening structure 19b described above in connection to FIGS. 1A-1C. The second tensioning unit 15b is configured for irreversibly tensioning the first side safety structure 1a and the second safety structure 1b in relation to the vehicle body structure 3 in a vehicle impact event for minimizing play between the vehicle body structure 3, the first side door 4a, and the second side door 4b.

The second tensioning unit 15b may comprises a second pyrotechnic tensioning device 16b configured for tensioning the first side safety structure 1a and the second safety structure 1b in relation to the vehicle body structure 3. The second tensioning unit 15b may have any suitable configuration, and it should be understood that the second tensioning unit 15b could have a design and construction similar to tensioning devices used in seat belt restraint systems, such as for example a seat belt pyrotechnic pre-tensioner. Other tensioning devices than pyrotechnical may also be used in other embodiments.

In a vehicle impact event, the second tensioning unit 15b is configured for being irreversibly displaced from an untensioned state $S_U$ to a tensioned state $S_T$. The states are suitably controlled by the control unit. The untensioned state $S_U$ is schematically shown in FIG. 7B and the tensioned state $S_T$ in FIG. 7C. When the second tensioning unit 15b is displaced from the untensioned state $S_U$ to the tensioned state $S_T$, the second side safety structure 1b together with the first side safety structure 1b is pulled in a direction towards the second hook structure 19a.

The first side safety structure 1a is connected to the connecting device 6 via the safety release system $S_R$. The safety release system $S_R$ is arranged between the first side safety structure 1a and the connecting device 6, and the connecting device 6 is configured for releasably attaching the first side safety structure 1a to the second side safety structure 1b.

In vehicles equipped with a side impact restraint protection system S, it is of high importance that side doors of the vehicle can be opened after a vehicle impact event. In FIGS. 1A-1C, 2A-2C, 3A-3B, and 4A-4B, the safety release system $S_R$ being part of the side impact restraint protection system S for a vehicle V is schematically illustrated. The safety release system $S_R$ is arranged for releasing the connection between the first side safety structure 1a and the connecting device 6 of the side impact restraint protection system S after a vehicle impact event, and the safety release system $S_R$ is an important safety feature of the side impact restraint protection system S. The safety release system $S_R$ is thus configured for enabling opening of the first side door 4a and/or the second vehicle door 4b after the vehicle impact event.

As schematically shown in FIG. 1A, the first side safety structure 1a is arranged in connection to the first side door 4a. The safety release system $S_R$ comprises a releasing mechanism 100 and a releasing member 101 detachable from each other. The safety release system $S_R$ is configured for being arranged in a first state S1 where the releasing mechanism 100 and the releasing member 101 are connected to each other, as shown in FIGS. 2A-2B and 3A-3B, and a second state S2 where the releasing mechanism 100 and the releasing member 101 are disconnected from each other, as shown in FIGS. 2C and 4A-4B.

The safety release system $S_R$ is in the illustrated embodiments arranged between the first side safety structure 1a and the connecting device 6, and the safety release system $S_R$ is configured for releasing the connection between the first side safety structure 1a and the connecting device 6 of the side impact restraint protection system S after the vehicle impact event. After such an impact event, it may due to vehicle deformation be impossible to disconnect the connecting device 6 for opening the vehicle side door or side doors, and then the safety release system $S_R$ is instead used for disconnecting the first side door 4a and/or the second side door 4b as shown in the illustrated embodiments. The safety release system $S_R$ is thus arranged for releasing the connection between the first side safety structure 1a and the connecting device 6 after the vehicle impact event. As described above, the first side safety structure 1a is arranged in connection to the first side door 4a of the vehicle V, and the safety release system $S_R$ is configured for enabling opening of the first side door 4a and/or the second side door 4b, after the vehicle impact event. In an alternative non-illustrated embodiment, the safety release system $S_R$ is instead arranged between the second side safety structure 1b and the connecting device 6, and the safety release system $S_R$ is configured for releasing the connection between the second side safety structure 1b and the connecting device 6 of the side impact restraint protection system S after the vehicle impact event.

As described above, the safety release system $S_R$ comprises the releasing mechanism 100 and the releasing member 101 detachably arranged in relation to each other. In the illustrated embodiment, the releasing mechanism 100 is attached to the first side safety structure 1a, and the releasing member 101 is connected to the connecting device 6. The safety release system $S_R$ is configured for being arranged in a first state S1 where the releasing mechanism 100 and the releasing member 101 are connected to each other, as shown in FIGS. 2A and 3A-3B, and a second state S2 where the releasing mechanism 100 and the releasing member 101 are disconnected from each other, as shown in FIGS. 2C and 4A-4B.

The releasing mechanism 100 comprises a hook member 102 and the releasing member 101 comprises a hook receiving opening 101a. The hook member 102 is configured for being engaged with the hook receiving opening 101a in the first state S1 and configured for being disengaged from the hook receiving opening 101a in the second state S2. The hook member 102 is configured for pivoting from an engaged position $P_E$ in the first state S1, as illustrated in FIGS. 2A and 3A-3B, to a disengaged position $P_D$ in the second state S2, as illustrated in FIGS. 2C and 4A-4B.

As shown in the illustrated embodiments, the hook member 102 is pivotally displaceable by one or more springs 106. The hook member 102 is pre-tensioned with the springs 106 in the first state S1, and the springs 106 are displacing the hook member 102 from the engaged position $P_E$ to the disengaged position $P_D$ in the second state S2. The springs 106 may have any suitable configuration, such as for example torsion springs or other suitable spring mechanisms. The releasing mechanism 100 further comprises a safety pin 103, which is preventing displacement of the hook member 102 from the engaged position $P_E$ to the disengaged position $P_D$ in the first state S1. In the second state S2, the safety pin 103 is allowing displacement of the hook member 102 from the engaged position $P_E$ to the disengaged position $P_D$.

Figure 3B:
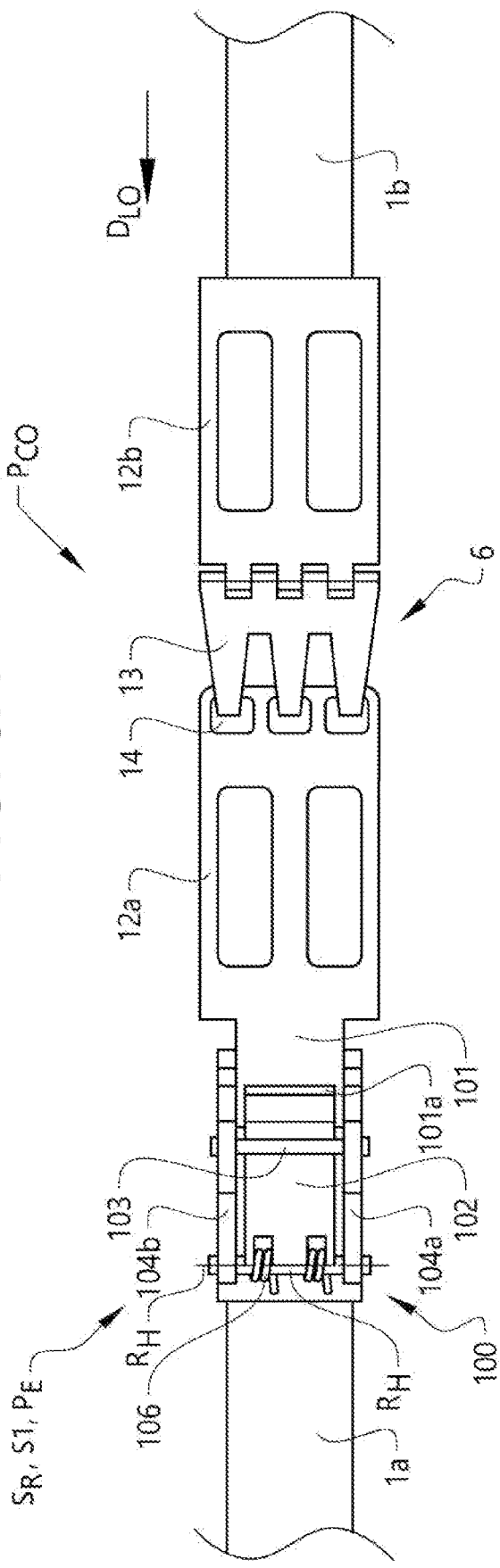

The releasing mechanism 100 comprises a first wall structure 104a and a second wall structure 104b, as schematically illustrated in FIGS. 2A-2C, 3A-3B, and 4A-4B. The hook member 102 is pivotally connected to and extending between the first wall structure 104a and the second wall structure 104b, and the hook member 102 is arranged to pivot around a hook rotational axis $R_H$ when the safety release system $S_R$ is displaced from the first state S1 to the second state S2. The pivoting arrangement of the hook member 102 may for example be accomplished with a shaft extending between the first wall structure 104a and the second wall structure 104b, where the hook member 102 is rotatably attached to the shaft, or alternatively where the shaft is rotatably arranged in relation to the wall structures, allowing a pivoting movement of the hook member 102. In the first state S1, the hook member 102 is in engagement with the hook receiving opening 101a in the engaged position $P_E$, as shown in FIGS. 2A and 3A-3B. In the second state S2, the hook member is disengaged from the hook receiving opening 101a in the disengaged position $P_D$, as shown in FIGS. 2C and 4A-4B.

The first wall structure 104a comprises a first safety pin track 105a and the second wall structure 104b comprises a second safety pin track 105b. The safety pin 103 is movably connected to and extending between the first wall structure 104a and the second wall structure 104b. The safety pin 103 is configured to move in relation to the first wall structure 104a in the first safety pin track 105a and in relation to the second wall structure 104b in the second safety pin track 105b from a locked position $P_L$ in the first state S1 where the safety pin 103 is blocking movement of the hook member 102, as shown in FIGS. 2A and 3A-3B, to an unlocked position $P_U$ in the second state S2 where the safety pin 103 is allowing movement of the hook member 102 from the engaged position $P_E$ to the disengaged position $P_D$, as shown in FIGS. 2C and 3A-3B.

The releasing mechanism comprises an actuating unit 107 connected to the safety pin 103, as schematically indicated in FIG. 2A. The actuating unit 107 is configured for displacing the safety pin 103 from the locked position $P_L$ in the first state S1 to the unlocked position $P_U$ in the second state S2. The actuating unit 107 may for example be a mechanical actuator, where a wire structure in one end is connected to the safety pin 103 and in the other end to an actuating handle. When moving the actuating handle, the safety pin 103 is displaced from the locked position $P_L$ to the unlocked position $P_U$. In this way, the actuating handle is used for changing the state of the safety release system $S_R$, from the first state S1 to the second state S2. When moving the actuating handle, the safety pin 103 is moved from the locked position $P_L$ to the unlocked position $P_U$, and in the unlocked position $P_U$ the hook member 102 is displaced from the engaged position $P_E$ to the disengaged position $P_D$ by the springs 106. The actuating handle may be arranged on the vehicle V for easy access from inside the vehicle and outside the vehicle. The actuating unit may alternatively comprise two actuating handles connected to the safety pin 103, one arranged inside the passenger compartment of the vehicle V and one in connection to an external surface of the vehicle V.

In an alternative non-illustrated embodiment, instead of the spring arrangement the hook member 102 may be pivotally displaceable by an electric motor, where the electric motor upon activation by the control unit is configured for displacing the hook member 102 from the engaged position $P_E$ in the first state S1 to the disengaged position $P_D$ in the second state S2. In a further alternative non-illustrated embodiment, the actuating unit 107 may alternatively be arranged as an electric actuator, for displacing the safety pin 103, upon initiation by a user via for example an electric switch arrangement connected to the actuating unit 107 or remotely controlled via a mobile phone app. The control unit is suitably connected to the electric actuator for controlling the system. The electric actuator may for example be a solenoid or other type of linear or rotary actuator used for displacing the safety pin 103 from the locked position $P_L$ to the unlocked position $P_U$. If using an electric motor for displacing the hook member 102, the safety pin 103 may be omitted if suitable, and the electric motor can be activated upon initiation by a user via for example an electric switch arrangement connected to the electric motor.

The safety release system $S_R$ is operated after a vehicle impact event when the connecting device 6 is damaged or prevented from being displaced from the connected position $P_{CO}$ to the disconnected position $P_{DI}$, for example if a deformation of the vehicle body structure 3 and/or of one or more side doors prevents normal operation of the connecting device 6 for opening the vehicle side doors. If a vehicle impact event has occurred, and the side doors of the vehicle V cannot be opened or only partly opened due to malfunctioning or damaged components, the safety release system $S_R$ may be operated by an occupant or user of the vehicle V or by other persons in connection to the vehicle V, such as for example rescue personnel. The control unit may be used for detecting malfunctioning or damaged components, or alternatively manually detected by a person trying to open the side doors with the door opening mechanism.

To operate the safety release system $S_R$ of the vehicle V, the safety release system $S_R$ is arranged in a second state S2 after the vehicle impact event. In the second state S2, the releasing mechanism 100 and the releasing member 101 are disconnected from each other for releasing the connection between the first side safety structure 1a and the connecting device 6, which is enabling opening of the first side door 4a and the second side door 4b. In order to release the connection, the safety pin 103 is moved from the locked position $P_L$ to the unlocked position $P_U$ in the second state S2, allowing movement of the hook member 102 from the engaged position $P_E$ to the disengaged position $P_D$. The safety pin 103 is as described above displaced with the actuating unit 107 from the locked position $P_L$ to the unlocked position $P_U$. After movement of the safety pin 103 to the unlocked position $P_U$, the hook member 102 is released from the hook receiving opening 101a in the second state S2. The hook member 102 is pivoted from the engaged position $P_E$ in the first state S1 to the disengaged position $P_D$ in the second state S2, where the one or more springs 106 are displacing the hook member 102 from the engaged position $P_E$ to the disengaged position $P_D$ in the second state S2, pivoting the hook member 102 from an engaged position $P_E$ in the first state S1 to a disengaged position $P_D$ in the second state S2. In the disengaged position, the releasing member 101 is allowed to slide away from the hook member 102 when opening the first side door 4a and/or the second side door 4b. Alternatively, the electric motor is displacing the hook member 102 from the engaged position $P_E$ to the disengaged position $P_D$ in the second state S2, as described above.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the control unit, the one or more programs comprising instructions for performing the method according to any one of the above-discussed embodiments. Moreover, the processor may be connected to one or more communication interfaces and/or sensor interfaces for receiving and/transmitting data with external entities such as e.g. sensors arranged on the vehicle surface, an off-site server, or a cloud-based server.

The processor or processors associated with the side impact restraint protection system S may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1a: First side safety structure
1b: Second side safety structure
2a: First structural element
2b: Second structural element
3: Vehicle body structure
4a: First side door
4b: Second side door
5: Door opening
6: Connecting device
7a: First connection member
7b: Second connection member
8a: First door beam
8b: Second door beam
9: Roof beam structure
10: Sill structure
11a: Rear edge, First side door
11b: Front edge, Second side door
12a: First connector part
12b: Second connector part
13: Hook
14: Hook opening
15a: First tensioning unit
15b: Second tensioning unit
16a: First pyrotechnic tensioning device
16b: Second pyrotechnic tensioning device
17: Outer door panel
18a: First hook structure
18b: First opening structure
19a: Second hook structure
19b: Second opening structure
20a: First part
20b: Second part
21: Opening
22: Main portion
23: Wire
100: Releasing mechanism
101: Releasing member
101a: Hook receiving opening
102: Hook member
103: Safety pin
104a: First wall structure
104b: Second wall structure
105a: First safety pin track
105b: Second safety pin track
106: Spring
107: Actuating unit
$A_1$: First end, First side safety structure
$A_2$: Second end, First side safety structure
$B_1$: First end, Second side safety structure
$B_2$: Second end, Second side safety structure
$D_{LA}$: Lateral direction
$D_{LO}$: Longitudinal direction
M: Side impact restraint protection system member
$R_H$: Hook rotational axis
$P_C$: Closed door position
$P_{CO}$: Connected position
$P_D$: Disengaged position
$P_{DI}$: Disconnected position
$P_E$: Engaged position
$P_L$: Locked position
$P_O$: Open door position
$P_U$: Unlocked position
S: Side impact restraint protection system
S1: First state
S2: Second state
$S_C$: Connected state
$S_D$: Disconnected state
$S_R$: Safety release system
$S_T$: Tensioned state
$S_U$: Untensioned state

What is claimed is:

1. A side impact restraint protection system for a vehicle, comprising a first side safety structure, a second side safety structure, a first structural element of a vehicle body structure of the vehicle, and a second structural element of the vehicle body structure, wherein the first side safety structure is arranged in connection to a first side door of the vehicle and the second side safety structure is arranged in connection to a second side door of the vehicle, wherein the first side door and the second side door are arranged to cover a common single door opening of the vehicle body structure in a closed door position, wherein the first structural element is arranged in a position in front of the door opening in a longitudinal direction of the vehicle, and the second structural element arranged in a position behind the door opening in the longitudinal direction, wherein in the closed door position the first side safety structure and the second side safety structure are configured to be releasably connected to each other via a connecting device, the first side safety structure is configured to be connected to the first structural element via a first connection member, and the second side safety structure is configured to be connected to the second structural element via a second connection member, and wherein the first side safety structure in a first end is releasably connected to the first structural element via the first connection member and in a second end connected to the connecting device, and wherein the second side safety structure in a first end is connected to the connecting device and in a second end releasably connected to the second structural element via the second connection member.

2. The side impact restraint protection system according to claim 1, wherein the system comprises a first door beam arranged in the first side door, wherein the first door beam is extending between a roof beam structure and a sill structure of the vehicle body structure when the first side door is arranged in the closed door position, and/or wherein the system comprises a second door beam arranged in the second side door, wherein the second door beam is extending between the roof beam structure and the sill structure of the vehicle body structure when the second side door is arranged in the closed door position.

3. The side impact restraint protection system according to claim 2, wherein the first door beam is configured for replacing a B-pillar of the vehicle body structure, and/or wherein the second door beam is configured for replacing a B-pillar of the vehicle body structure.

4. The side impact restraint protection system according to claim 2, wherein the first side door is a front vehicle side door, and wherein the first door beam is arranged in connection to a rear edge of the first side door, and/or wherein the second side door is a rear vehicle side door, and wherein the second door beam is arranged in connection to a front edge of the second side door.

5. The side impact restraint protection system according to claim 2, wherein the first side safety structure in a lateral direction of the vehicle is arranged outside of the first door beam, and/or wherein the second side safety structure in a lateral direction of the vehicle is arranged outside of the second door beam.

6. The side impact restraint protection system according to claim 1, wherein the connecting device comprises a first connector part connected to the first side safety structure and a second connector part connected to the second side safety structure, wherein the first connector part and the second connector part are configured for releasably connecting the first side safety structure and the second side safety structure to each other, wherein the connecting device is configured for being arranged in a connected state where the first connector part and the second connector part are connected to each other and a disconnected state where the first connector part and the second connector part are disconnected from each other.

7. The side impact restraint protection system according to claim 6, wherein the first connector part or the second connector part comprises a hook and the other of the first connector part or the second connector part comprises one or more hook openings, wherein the hook is configured for being engaged with the one or more hook openings in the connected state and configured for being disengaged from the one or more hook openings in the disconnected state.

8. The side impact restraint protection system according to claim 7, wherein the hook is configured for pivoting between a connected position in the connected state and a disconnected position in the disconnected state.

9. The side impact restraint protection system according to claim 1, wherein the system comprises a first tensioning unit connected to the first side safety structure, wherein the first tensioning unit is configured for irreversibly tensioning the first side safety structure and the second safety structure in relation to the vehicle body structure in a vehicle impact event for minimizing play between the vehicle body structure, the first side door, and the second side door, and/or wherein the system comprises a second tensioning unit connected to the second side safety structure, wherein the second tensioning unit is configured for irreversibly tensioning the first side safety structure and the second safety structure in relation to the vehicle body structure in a vehicle impact event for minimizing play between the vehicle body structure, the first side door, and the second side door.

10. The side impact restraint protection system according to claim 9, wherein the first tensioning unit comprises a first pyrotechnic tensioning device configured for tensioning the first side safety structure and the second safety structure in relation to the vehicle body structure, and/or wherein the second tensioning unit comprises a second pyrotechnic tensioning device configured for tensioning the first side safety structure and the second safety structure in relation to the vehicle body structure.

11. The side impact restraint protection system according to claim 1, wherein the first side safety structure is connected to the connecting device via a safety release system, wherein the safety release system is arranged between the first side safety structure and the connecting device, wherein the safety release system is configured for releasing a connection between the first side safety structure and the connecting device after a vehicle impact event.

12. The side impact restraint protection system according to claim 11, wherein the safety release system comprises a releasing mechanism and a releasing member detachably arranged in relation to each other, wherein the safety release system is configured for being arranged in a first state where the releasing mechanism and the releasing member are connected to each other and a second state where the releasing mechanism and the releasing member are disconnected from each other.

13. The side impact restraint protection system according to claim 12,
wherein the releasing mechanism comprises a hook member and the releasing member comprises a hook receiving opening, wherein the hook member is configured for being engaged with the hook receiving opening in the first state and configured for being disengaged from the hook receiving opening in the second state, wherein the hook member is configured for pivoting from an engaged position in the first state to a disengaged position in the second state.

14. The side impact restraint protection system according to claim 12,
wherein the releasing mechanism comprises a safety pin configured for preventing displacement of the hook member from the engaged position to the disengaged position in the first state, and wherein the safety pin is configured for allowing displacement of the hook member from the engaged position to the disengaged position in the second state.

15. The side impact restraint protection system according to claim 14,
wherein the releasing mechanism comprises an actuating unit connected to the safety pin, wherein the actuating unit is configured for displacing the safety pin from a locked position to an unlocked position in the second state.

16. The side impact restraint protection system according to claim 1,
wherein the first side safety structure is movably arranged in relation to the first side door, and the second side safety structure is movably arranged in relation to the second side door.

17. The side impact restraint protection system according to claim 1,
wherein the first structural element is arranged forward of the door opening in a longitudinal direction of the vehicle, and the second structural element is arranged rearward of the door opening in the longitudinal direction.

18. The side impact restraint protection system according to claim 1,
wherein the first structural element is an A-pillar of the vehicle body structure, and the second structural element is a C-pillar of the vehicle body structure.

19. The side impact restraint protection system according to claim 1,
wherein the first side safety structure is arranged as a beam structure in the first side door, a flexible strap structure in the first side door, or a membrane structure integrated in an outer door panel of the first side door, and wherein the second side safety structure is arranged as a beam structure in the second side door, a flexible strap structure in the second side door, or a membrane structure integrated in an outer door panel of the second side door.

20. The side impact restraint protection system according to claim 1,
wherein the system comprises a first pair of the first side safety structure and the second side safety structure, and a second pair of the first side safety structure and the second side safety structure, arranged in the first side door and the second side door respectively.

* * * * *